(12) United States Patent
Higgins

(10) Patent No.: US 12,304,669 B2
(45) Date of Patent: May 20, 2025

(54) DRONE LANDING GEAR

(71) Applicant: Drone Amplified, Inc., Lincoln, NE (US)

(72) Inventor: James Higgins, Lincoln, NE (US)

(73) Assignee: Drone Amplified, Inc., Lincoln, NE (US)

( * ) Notice: Subject to any disclaimer, the term of this patent is extended or adjusted under 35 U.S.C. 154(b) by 0 days.

(21) Appl. No.: 18/777,884

(22) Filed: Jul. 19, 2024

(65) Prior Publication Data
US 2025/0042579 A1 Feb. 6, 2025

Related U.S. Application Data

(60) Provisional application No. 63/529,872, filed on Jul. 31, 2023.

(51) Int. Cl.
*B64U 60/50* (2023.01)
*B64U 60/30* (2023.01)

(52) U.S. Cl.
CPC .............. *B64U 60/50* (2023.01); *B64U 60/30* (2023.01)

(58) Field of Classification Search
CPC ................................ B64U 60/50; B64U 60/30
See application file for complete search history.

(56) References Cited

U.S. PATENT DOCUMENTS

| | | | | | |
|---|---|---|---|---|---|
| 2,021,439 | A | * | 11/1935 | Wells | B64C 25/10 244/102 R |
| 2,176,461 | A | * | 10/1939 | Larsen | B64C 25/16 244/102 R |
| 2,222,975 | A | * | 11/1940 | Brown | B64C 25/12 244/102 R |
| 2,332,844 | A | * | 10/1943 | De Muyser | B64C 25/12 244/102 R |
| 2,589,434 | A | * | 3/1952 | Robert | B64C 25/20 244/102 R |
| 2,691,496 | A | * | 10/1954 | Katzenberger | B64C 25/04 244/104 FP |

(Continued)

FOREIGN PATENT DOCUMENTS

| | | |
|---|---|---|
| CN | 202219767 U | 5/2012 |
| CN | 106741876 B | 7/2022 |

(Continued)

OTHER PUBLICATIONS

Cargo Landing Gear [Alta X], "https://store.freeflysystems.com/products/cargo-landing-gear," retrieved from the Internet on Nov. 18, 2024.

(Continued)

*Primary Examiner* — Medhat Badawi
(74) *Attorney, Agent, or Firm* — Morse, Barnes-Brown & Pendleton, P.C.; Sean D. Detweiler, Esq.

(57) ABSTRACT

A modular and stowable drone landing gear system configured for repeated assembly and disassembly. The landing gear system makes use of reversible and interchangeable parts for easy assembly and replacement. The landing gear further makes use of energy-absorbent nesting brackets that absorb impact force and accordingly reduce force experienced by the rest of the components of the landing gear as well as provide nesting storage for the components in a disassembled and stowed state.

28 Claims, 24 Drawing Sheets

(56) References Cited

U.S. PATENT DOCUMENTS

| | | | | |
|---|---|---|---|---|
| 2,973,168 | A * | 2/1961 | Hartel | B64C 25/06 244/104 R |
| 2,984,437 | A * | 5/1961 | Jensen | B64C 25/06 244/104 R |
| 3,121,547 | A * | 2/1964 | Paxhia | B64C 25/14 244/102 R |
| 3,533,613 | A * | 10/1970 | Bendicsen | B64C 25/60 267/64.28 |
| 3,822,048 | A * | 7/1974 | Hartel | B64C 25/60 244/104 R |
| 3,951,361 | A * | 4/1976 | Hrusch | B64C 25/10 244/102 R |
| 4,170,332 | A * | 10/1979 | Masclet | B64C 25/14 244/102 R |
| 4,189,117 | A * | 2/1980 | Masclet | B64C 25/10 244/102 R |
| 4,312,485 | A * | 1/1982 | Masclet | B64C 25/12 244/102 R |
| 4,422,602 | A * | 12/1983 | Turiot | B64C 25/14 244/102 R |
| 4,537,374 | A * | 8/1985 | Barnoin | F16F 7/125 188/371 |
| 5,337,976 | A * | 8/1994 | Derrien | B64C 25/14 D12/345 |
| 9,321,525 | B2 * | 4/2016 | Luce | B64C 25/60 |
| 9,434,481 | B2 * | 9/2016 | McGeer | B64F 1/04 |
| 9,650,128 | B2 * | 5/2017 | Fenny | B64C 25/18 |
| 9,731,816 | B2 * | 8/2017 | Harris, III | B64C 25/36 |
| 10,202,188 | B2 * | 2/2019 | del Castillo | B64U 10/16 |
| 10,632,804 | B2 * | 4/2020 | Braithwaite | B63G 8/001 |
| 11,008,091 | B2 * | 5/2021 | Tsai | B64C 25/18 |
| 11,059,598 | B2 * | 7/2021 | Arkus | B64C 1/063 |
| 11,198,504 | B2 | 12/2021 | Bernard | |
| 11,584,515 | B2 * | 2/2023 | Martin | B64C 25/14 |
| 11,760,478 | B2 * | 9/2023 | Hoshide | B64U 50/23 244/2 |
| 11,869,363 | B1 * | 1/2024 | Kunkel | B64U 30/291 |
| 12,024,277 | B2 * | 7/2024 | Acks | B64C 25/14 |
| 12,084,178 | B2 * | 9/2024 | Shi | B64U 70/00 |
| 2011/0031348 | A1 * | 2/2011 | Thompson | B64C 25/12 244/102 R |
| 2012/0111999 | A1 * | 5/2012 | Acks | B64C 25/34 244/102 A |
| 2017/0291677 | A1 * | 10/2017 | Harris | B64U 10/13 |
| 2018/0312245 | A1 * | 11/2018 | Klim | B64C 25/60 |
| 2019/0033862 | A1 * | 1/2019 | Groden | G05D 1/0055 |
| 2019/0248479 | A1 * | 8/2019 | Smith | B64F 5/00 |
| 2020/0108928 | A1 * | 4/2020 | Nwosu | B64U 50/11 |
| 2020/0346743 | A1 * | 11/2020 | Bernard | B64C 25/18 |
| 2021/0039774 | A1 * | 2/2021 | Isaac | B64C 25/20 |
| 2021/0078697 | A1 * | 3/2021 | Klassen | F16F 15/04 |
| 2021/0237901 | A1 * | 8/2021 | von Flotow | B64F 1/0295 |
| 2021/0245867 | A1 * | 8/2021 | Acks | B64C 25/20 |
| 2021/0331798 | A1 * | 10/2021 | Yi | B64F 1/18 |
| 2021/0339294 | A1 * | 11/2021 | Melanson | B64U 10/13 |
| 2021/0381934 | A1 * | 12/2021 | Abdellatif | B64C 21/02 |
| 2021/0403155 | A1 * | 12/2021 | Neiser | B64C 3/38 |
| 2022/0119098 | A1 * | 4/2022 | Patel | B64C 25/28 |
| 2022/0363372 | A1 * | 11/2022 | Gao | B64U 60/50 |
| 2022/0411047 | A1 * | 12/2022 | Mihai | B64C 25/20 |
| 2023/0001757 | A1 * | 1/2023 | Ramezani | B60F 5/02 |
| 2023/0017118 | A1 * | 1/2023 | Shi | B64U 60/50 |
| 2023/0095261 | A1 * | 3/2023 | Wilson | B64C 25/26 244/102 SL |
| 2023/0133184 | A1 * | 5/2023 | Liu | B64C 25/60 244/17.17 |
| 2023/0140387 | A1 * | 5/2023 | Infanti | B64C 39/024 244/114 R |
| 2023/0159158 | A1 * | 5/2023 | Scotto | B64C 25/001 244/102 R |
| 2023/0312144 | A1 * | 10/2023 | Hoshide | B64U 10/13 244/17.23 |
| 2023/0331376 | A1 * | 10/2023 | Ensslin | B64C 25/50 |
| 2024/0182158 | A1 * | 6/2024 | Kim | B64C 25/24 |
| 2024/0326992 | A1 * | 10/2024 | Bennett | B64C 25/20 |
| 2024/0351714 | A1 * | 10/2024 | Wei | B64U 60/40 |
| 2024/0400238 | A1 * | 12/2024 | Luong | B64U 20/50 |
| 2024/0417113 | A1 * | 12/2024 | Loh | B64U 40/10 |
| 2025/0011015 | A1 * | 1/2025 | Kim | B64U 80/70 |
| 2025/0026006 | A1 * | 1/2025 | Deemyad | B64U 70/30 |
| 2025/0042579 | A1 * | 2/2025 | Higgins | B64U 60/30 |
| 2025/0083841 | A1 * | 3/2025 | Dickinson | B64U 20/80 |

FOREIGN PATENT DOCUMENTS

| | | |
|---|---|---|
| DE | 10150807 A1 | 4/2003 |
| EP | 3239044 B1 | 11/2017 |
| FR | 2891240 A1 | 3/2007 |
| FR | 2983831 A1 | 6/2013 |
| FR | 3000022 A1 | 6/2014 |
| JP | 6640930 B2 | 2/2020 |
| KR | 101782741 B1 | 9/2017 |
| KR | 20180033011 A | 4/2018 |
| KR | 20190116748 A | 10/2019 |
| KR | 102333831 B1 | 12/2021 |
| KR | 20220096715 A | 7/2022 |
| SE | 1650457 A1 | 10/2017 |
| WO | 2021143449 A1 | 7/2021 |

OTHER PUBLICATIONS

Drone Landing Gear for Ronin 2, "https://www.ignitedigi.com.au/products/drone-landing-gear-for-ronin2," retrieved from the Internet on Nov. 18, 2024.

Inspired Flight IF 1200a, "https://www.inspiredflight.com/if1200.php," retrieved from the Internet on Nov. 18, 2024.

KW Alta X Retractable Landing Gear, "https://www.facebook.com/profile/100064712885047/search/?q=alta%20x," retrieved from the Internet on Nov. 19, 2024.

Movi Pro Landing Gear—Freefly Store, "https://store.freeflysystems.com/products/movi-pro-landing-gear," retrieved from the Internet on Nov. 19, 2024.

Payload Landing Gear, "https://www.stratusleds.com/store/landing-gear-for-aerial-array," retrieved from the Internet on Nov. 18, 2024.

Retractable Landing Gear Set for Freefly Alta X | SLG-20-AX | XM2 Labs—XM2 Store, "https://xm2store.com.au/products/slg20-retractable-landing-gear-alta-x-drone," retrieved from the Internet on Nov. 18, 2024.

Skyview Landing Gear [AltaX], "https://store.freeflysystems.com/products/skyview-landing-gear-for-alta-x," retrieved from the Internet on Nov. 18, 2024.

* cited by examiner

DRONE LANDING GEAR

CROSS-REFERENCE TO RELATED APPLICATION(S)

This application claims priority to, and the benefit of, U.S. Provisional Application 63/529,872, filed Jul. 31, 2023, for all subject matter common to both applications. The disclosure of said provisional application is hereby incorporated by reference in its entirety.

FIELD OF THE INVENTION

The present invention relates to landing gear for drones, also known as Unmanned or Uncrewed Aerial Systems (UAS). In particular, the present invention relates to a drone landing gear system that is modular allowing for fast and simple assembly and disassembly, making it ideal for applications where components may need to be swapped out or replaced in challenging environments, such as outdoors.

BACKGROUND

Generally, drone landing gear systems and devices are designed primarily to be lightweight, to avoid blocking or obstructing payloads (e.g., camera views, delivery packages, and the like), and to provide a stable landing platform. However, these conventional approaches experience shortcomings.

Conventional approaches typically fail catastrophically with complete skids or legs breaking if they experience a hard landing with high impact forces. They lack specifically designed crumple zones to absorb impact. They further lack approaches to ensure that if there is a hard landing, that the landing gear will deform and break in such a way that leaves the rest of the drone standing upright and intact, thereby preserving the integrity of more valuable parts or parts that are more complex to replace.

Conventional approaches also typically exhibit vibrations that can impact sensitive onboard sensors and flight controls.

Conventional approaches also cannot be broken down into a compact package for transport without additional tools or in a manner that does not require orienting parts to particular sides or orientations of the aircraft upon reassembly.

Many conventional approaches have unnecessarily complex assemblies that make use of multiple unique individual components that have to be assembled in a specific manner using specific tools and fasteners.

Conventional approaches typically have mating joints for assembly that require tight tolerances that can be difficult to manufacture or are susceptible to wear or blockage from dirt or other debris.

Most conventional approaches also lack convenient autolocking features that require no tools or input to assemble but secure the landing gear together even if the user forgets to tighten it together. For example, much of the gear on the market either won't go together, or it falls apart without the user securing it, or it is assembled incorrectly.

Even conventional systems that address some of these issues can present new issues. For instance, they may be heavy to provide a stable landing, or they do not provide sufficient clearance for desired payloads.

SUMMARY

There is a need for lightweight drone landing gear that can be quickly assembled/disassembled, including in challenging environments, and that can break down into a compact package to allow easy transportation in limited space. This is needed because drone operators are often moving from one location to another and need to pack the drone, accessories, and landing gear in a typically hard case that can be easily and safely transported. Many times, these activities must occur in a field or forest or other outdoor location in which it could be very challenging to have to manage complex assemblies and many small parts. In addition, the landing gear must also be able to accommodate larger payloads such as industrial mapping cameras, wildland firefighting aerial ignition systems, LIDAR, and other similar payloads. These payloads are often sensitive to vibrations that can be induced by shaking and vibrating landing gear. Further, these payloads often cost as much as, or more than, the drone, so it is critical that the landing gear are robust enough, even during a hard landing, to ensure that the payload is kept intact and to minimize damage to the core structure of the drone.

The present invention addresses these issues and provides additional benefits. Features of the disclosed landing gear include:

- Crumple zones that are designed to absorb impact and minimize the chances of a landing gear vertical or horizontal component fully breaking which could cause substantial damage to the payload or drone.
- A vibration reduction latch that reduces any vibrations or resonant frequencies of the legs. Furthermore, in certain embodiments, the securing force of the vibration reduction latch is provided via the receiver portion of the vibration reduction latch and a connector cap on the end of the vertical strut which allows looser manufacturing tolerances of the mating components. In addition, this makes it more robust and resistant to long-term wear and potential environmental contaminates that could impede mating since the overall strut mate does not need to be as tight since the mate is primarily through the receiver and connector cap.
- An automatic locking latch that reduces the chance of a user incorrectly assembling the landing gear, which could result in the landing gear coming apart in flight.
- A nesting ability of the landing gear to break down into a compact form factor without additional tools, and/or in a manner that does not require orienting parts to particular sides or orientations of the aircraft upon reassembly.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
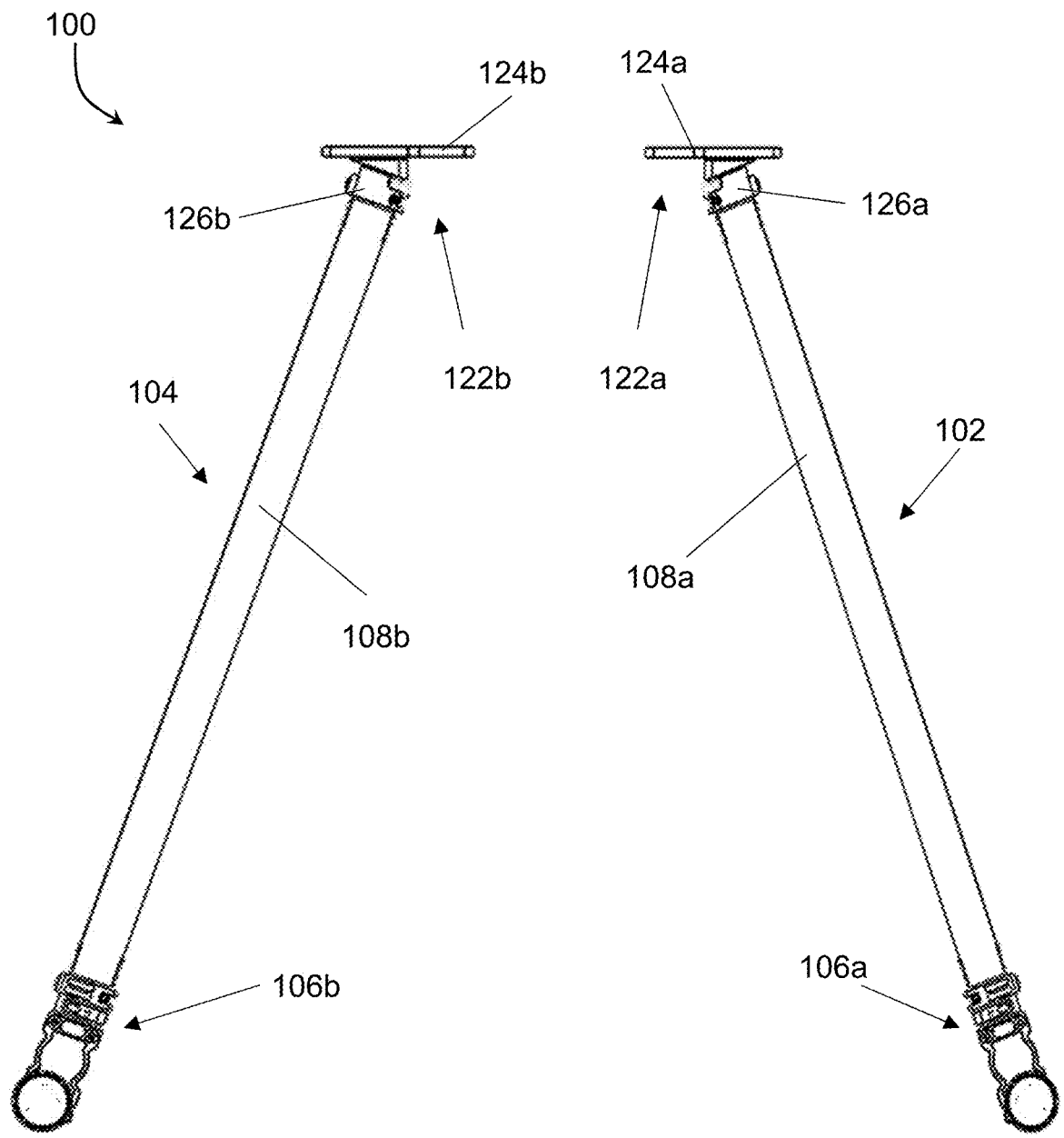
FIG. 1 is a front view showing a landing gear system in accordance with embodiments of the present invention.

An illustrative embodiment of the present invention relates to a landing gear system for medium to larger drones that require landing gear that is compact, quickly assembled and disassembled for stowing, and lightweight, while also enabling safe transport of large drone payloads that may be sensitive to vibration frequencies of the landing gear.

FIG. 1 through FIG. 24, wherein like parts are designated by like reference numerals throughout, illustrate an example embodiment or embodiments of a modular and stowable drone landing gear system configured for repeated assembly and disassembly according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 2:
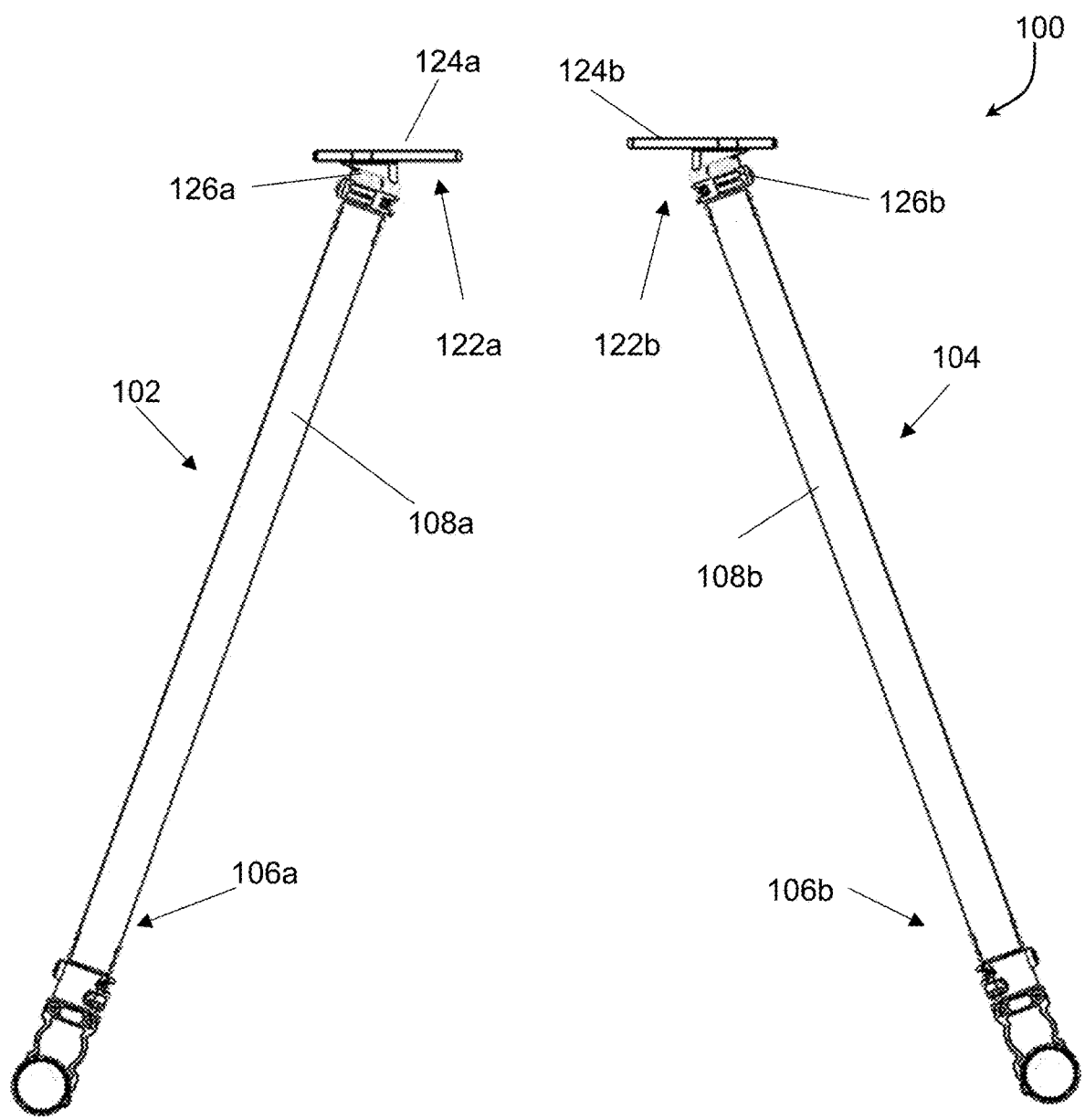
FIG. 2 is a rear view showing a landing gear system in accordance with embodiments of the present invention.
Figure 3:
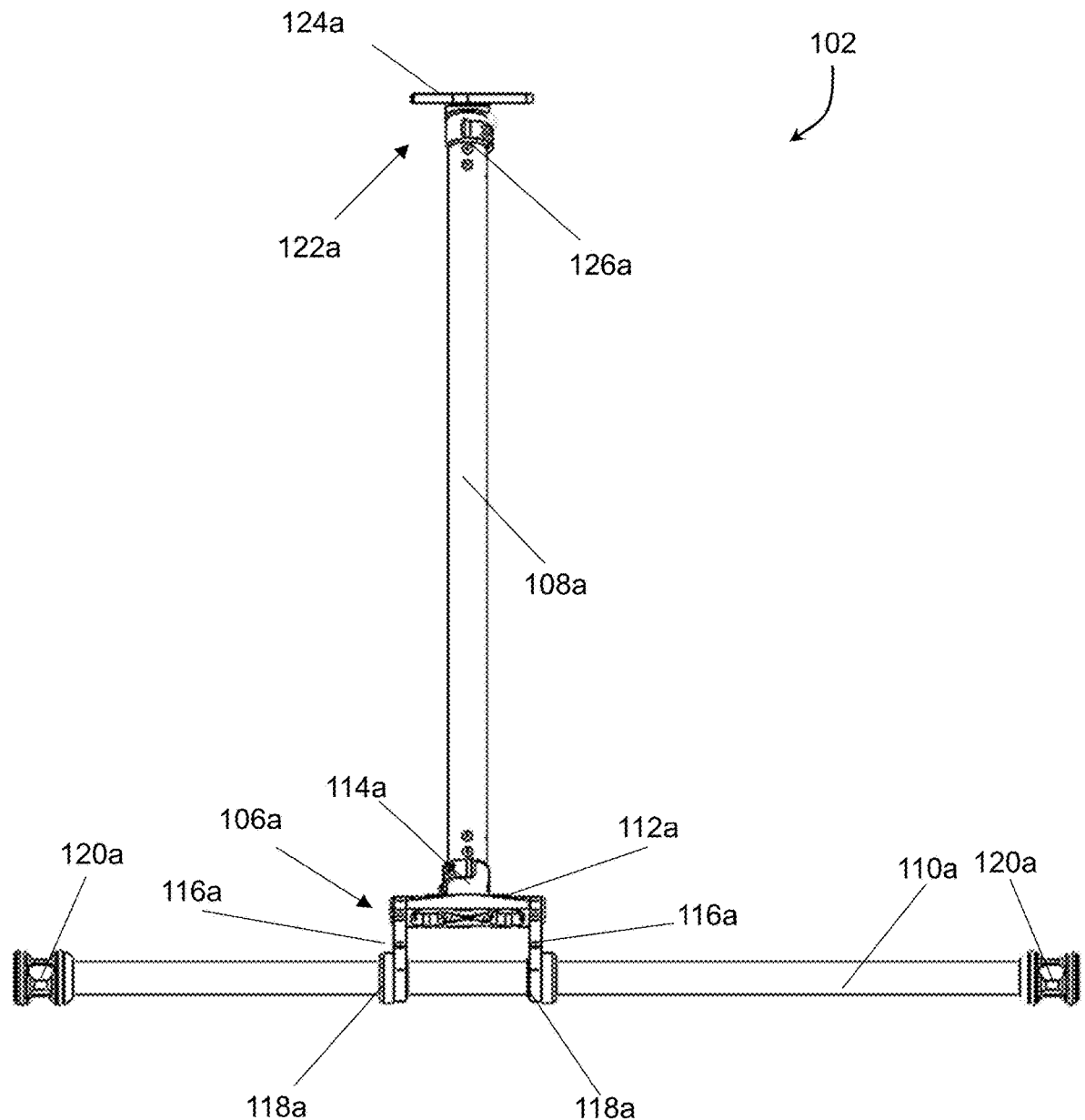
FIG. 3 is an outer-facing view showing the left side of a landing gear system in accordance with embodiments of the present invention.
Figure 4:
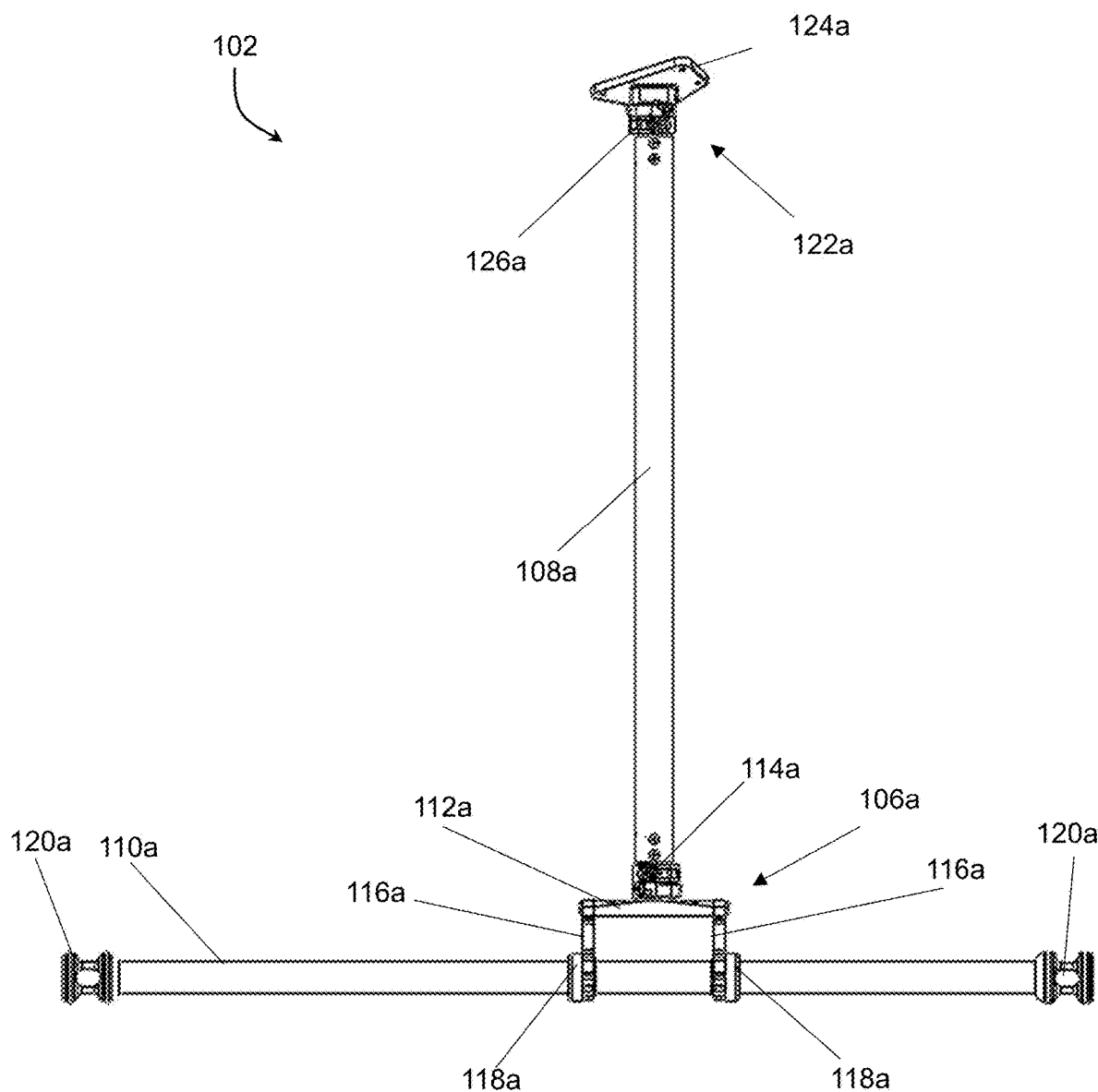
FIG. 4 is an inner-facing view showing the left side view of a landing gear system in accordance with embodiments of the present invention.
Figure 5:
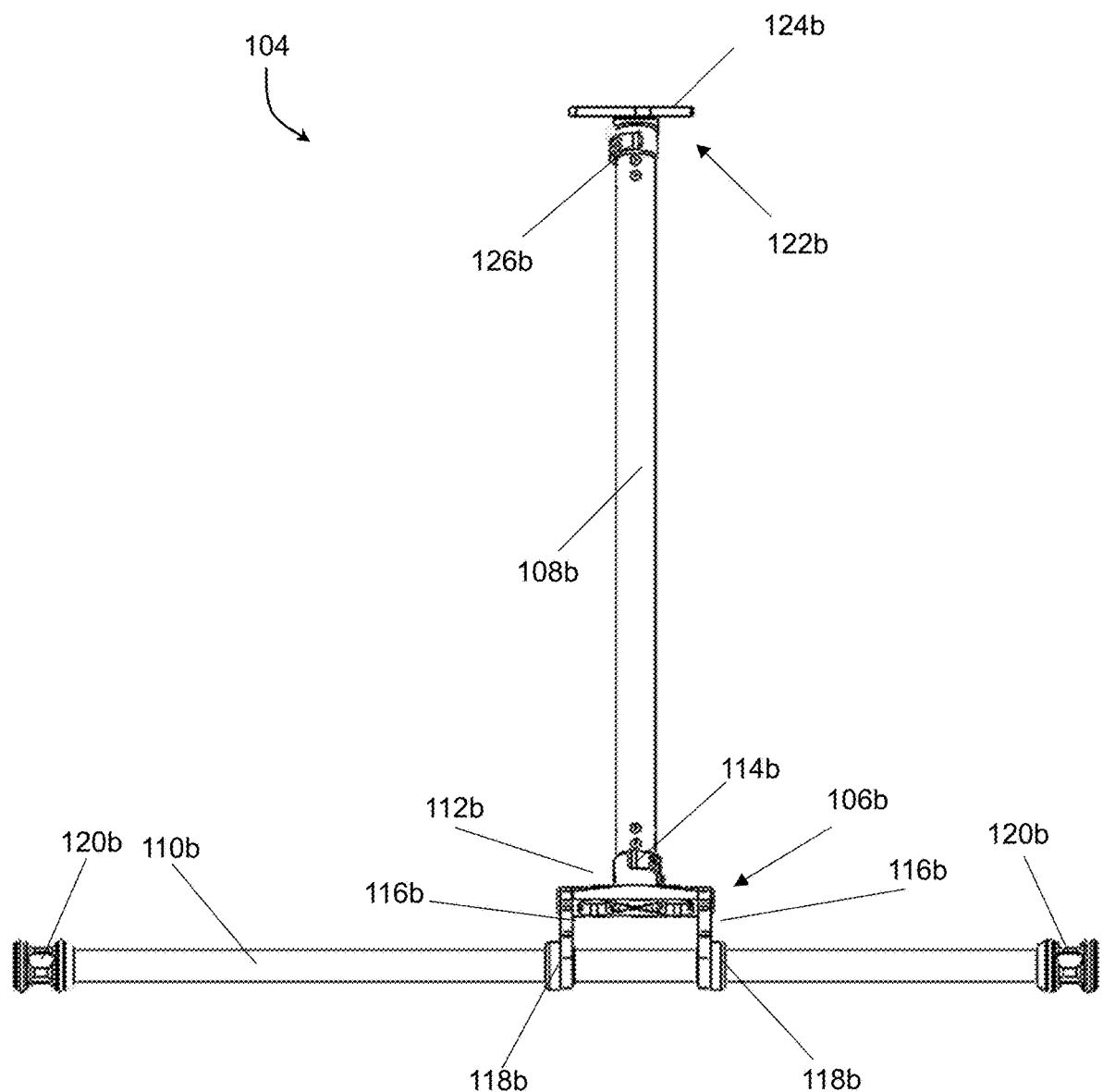
FIG. 5 is an outer-facing view showing the right side of a landing gear system in accordance with embodiments of the present invention.
Figure 6:
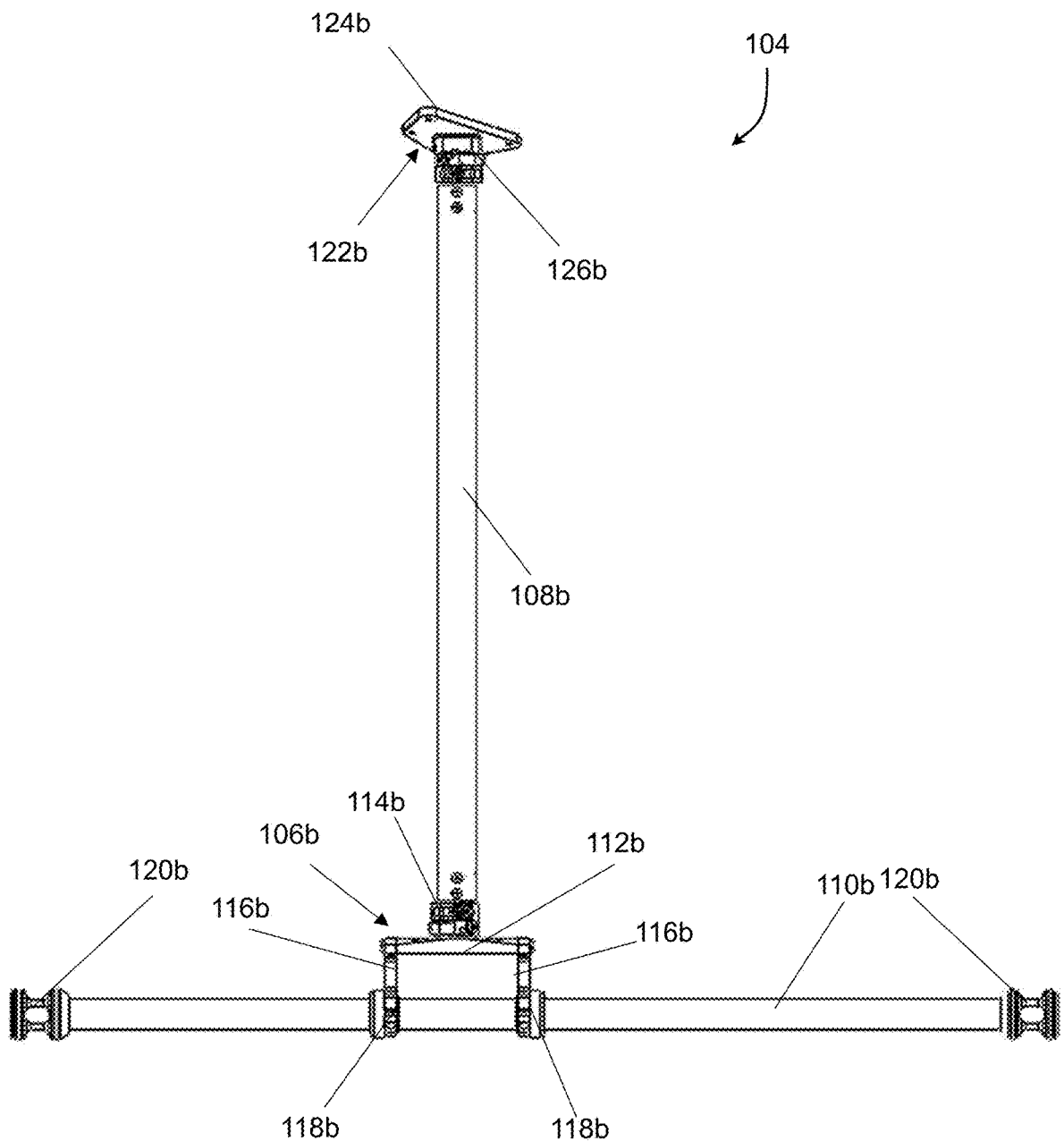
FIG. 6 is an inner-facing view showing the right side view of a landing gear system in accordance with embodiments of the present invention.

FIGS. 1-6 show an assembled landing gear system 100 in accordance with embodiments of the present invention. FIG. 1 is a front view. FIG. 2 is a rear view. FIG. 3 shows the outer-facing view of the left side 102 of the landing gear system. FIG. 4 shows the inner-facing view showing the left side 102 of the landing gear system. FIG. 5 shows the outer-facing view of the right side 104 of a landing gear system. FIG. 6 shows an inner-facing view of the right side 104 of a landing gear system.

In the embodiment of FIGS. 1-6, the landing gear system 100 includes a number of interchangeable and/or reversible parts. In the figures, the components used on the left side 102 use an "a" sub designation, and components on the right side use a "b" sub designation. However, it should be understood that the sub-designations "a" and b" are merely provided to identify duplicated components on each side of the landing gear system 100 and when discussing the generic part, the sub-designation may not be used and parts may be interchangeable.

The landing gear system 100 includes a plurality of combination crumple zone couplings 106, vertical struts 108, and horizontal skids 110. The plurality of combination crumple zone couplings 106 each further include lightweight cross-plate 112 having an upper side and an underside on an opposite side thereof, a coupling 114 disposed on the upper side of the lightweight cross-plate 112 configured to receive an end of a vertical strut 108, and two or more energy absorbent nesting brackets 116 extending generally outward from the underside of the cross-plate 112 distally spaced from each other. Each nesting bracket 116 is further connected with its own skid bracket 118 on an opposite end of the nesting bracket 116 from the cross-plate 112 and configured to removably and replaceably couple with a horizontal skid 110. The skid brackets 118 are axially aligned with each other to receive and couple to a same horizontal skid 110. The two or more energy-absorbent nesting brackets 116 are axially aligned such that when the landing gear is disassembled and stowed, each energy-absorbent nesting bracket 116 slidingly receives a vertical strut 108 therethrough in a nesting orientation generally parallel to a horizontal skid mounted 110 in the skid brackets 118.

On the left side, a first vertical strut 108a is removably and replaceably coupled with a first horizontal skid 110a by a first combination crumple zone coupling 106a. The first vertical strut 108a is coupled at the coupling 114a at the upper side of the lightweight cross-plate 112a. The first horizontal skid 110a is mounted in the skid brackets 118a of the first combination crumple zone coupling 106a.

On the right side, a second vertical strut 108b is removably and replaceably coupled with a second horizontal skid 110b by a second combination crumple zone coupling 106b.

The second vertical strut 108b is coupled at the coupling 114b at the upper side of the lightweight cross-plate 112b. The second horizontal skid 110b is mounted in the skid brackets 118b of the second combination crumple zone coupling 106b.

In certain embodiments, each vertical strut 108 comprises a tube formed from one or more of: carbon fiber, fiberglass, aluminum, and metal alloys. The vertical struts are designed to be reversible and interchangeable. Other possible shapes, configurations, and materials will be apparent to one skilled in the art given the benefit of this disclosure.

Similarly, in certain embodiments, the horizontal skids 110 comprise a tube formed from one or more of: carbon fiber, fiberglass, aluminum, and metal alloys. In some such embodiments, the horizontal skids 110 further comprise end caps 120 disposed on the ends of the horizontal skids 110. The end caps 120 are formed of a soft elastically deformable material to help absorb impact forces. The horizontal skids 110 are designed to be reversible and interchangeable. In certain embodiments, the plurality of combination crumple zone couplings 116 are mounted offset from a midpoint of the first 110a and second 110b horizontal skids resulting in the first 110a and second 110b horizontal skids being mounted off-center from the first 108a and second 108b vertical struts when the landing gear system 100 is in an assembled state as seen in FIGS. 3-6. Other possible shapes, configurations, and materials will be apparent to one skilled in the art given the benefit of this disclosure.

In some embodiments, the landing gear system 100 further includes two or more drone mounting mechanisms 122. Each mechanism includes a base 124 shaped and configured to attach to a drone and a coupling 126 extending from the base 124 at a desired angle for engaging another end of one of the first and second vertical struts 108. The desired angle at which each coupling 126 is attached to each base 124 is determined such that the first 108a and second 108b vertical struts extend outward and away from the drone when attached to the couplings 126 and a distance between each of the first 108a and second 108b vertical struts increases in conjunction with an increased distance from the bases 124a 124b and the drone.

Figure 7:
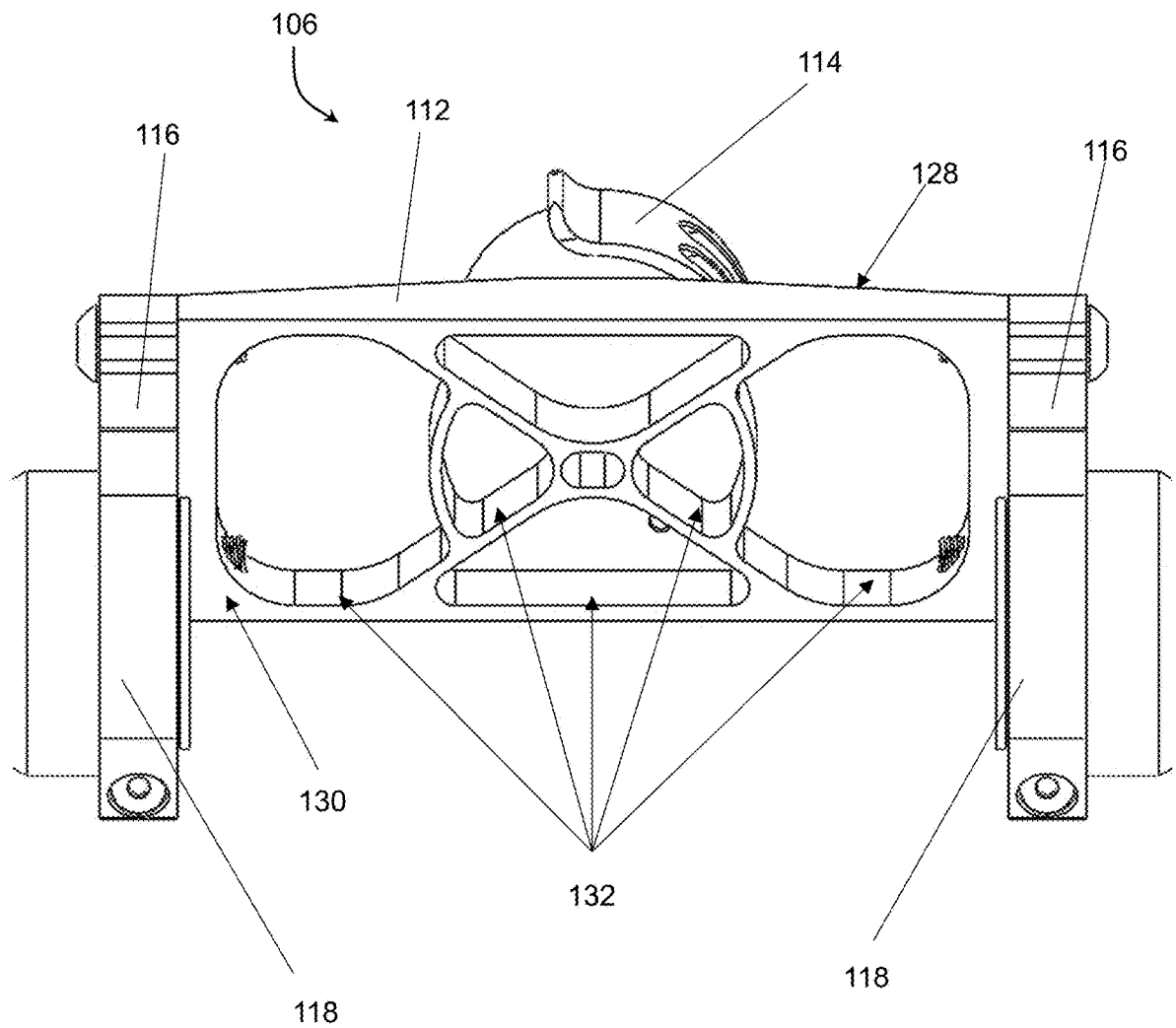
FIG. 7 is a bottom view of a lightweight cross-plate showing weight reduction features in accordance with an embodiment of the present invention.

A bottom view of a crumple zone couplings 106 in isolation can be seen in FIG. 7. Here it can be seen that the lightweight cross-plate 112 has an upper side 128 and an underside 130 on the opposite side thereof. The cross-plate can be formed of a carbon fiber, aluminum, fiberglass, or metal alloy. In some embodiments, such as seen here, the cross-plate 112 may further comprise a plurality of weight reduction cut-out features 132. Other possible shapes, configurations, and materials will be apparent to one skilled in the art given the benefit of this disclosure.

Figure 8:
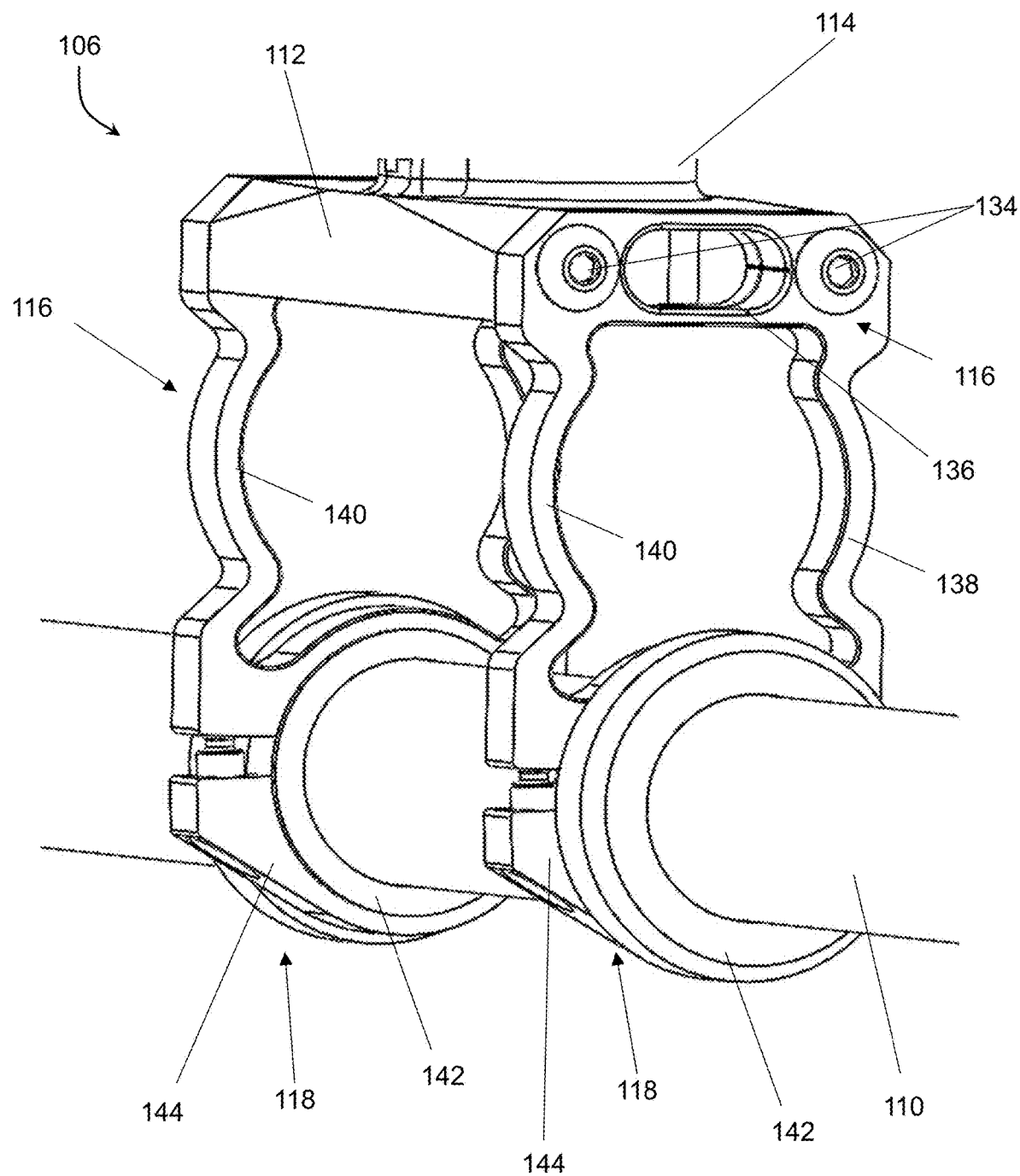
FIG. 8 is an isometric view of a combination crumple zone coupling in accordance with an embodiment of the present invention.
Figure 9:
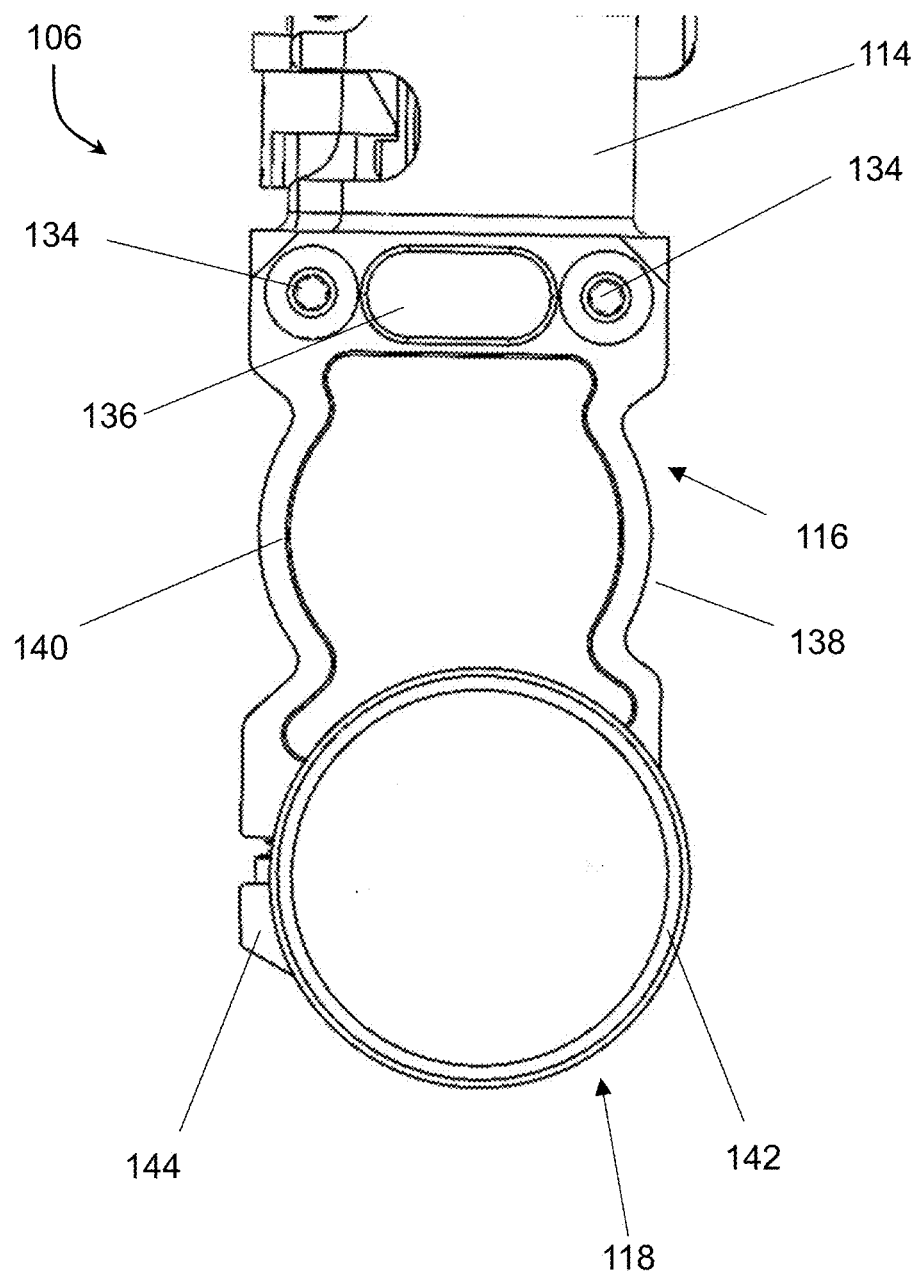
FIG. 9 is a front view of a combination crumple zone coupling in accordance with an embodiment of the present invention.
Figure 10:
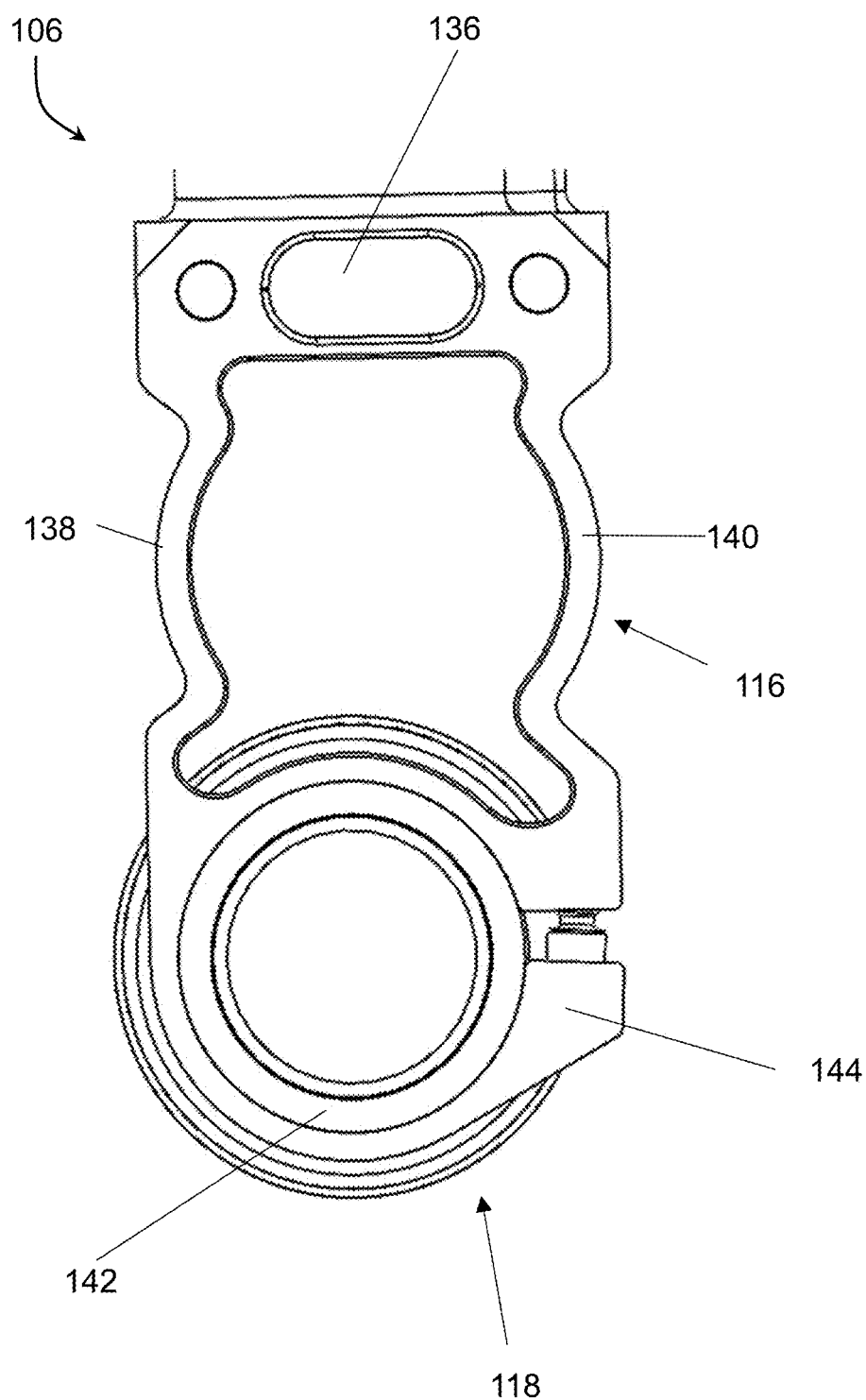
FIG. 10 is a back view of a combination crumple zone coupling in accordance with an embodiment of the present invention.
Figure 11:
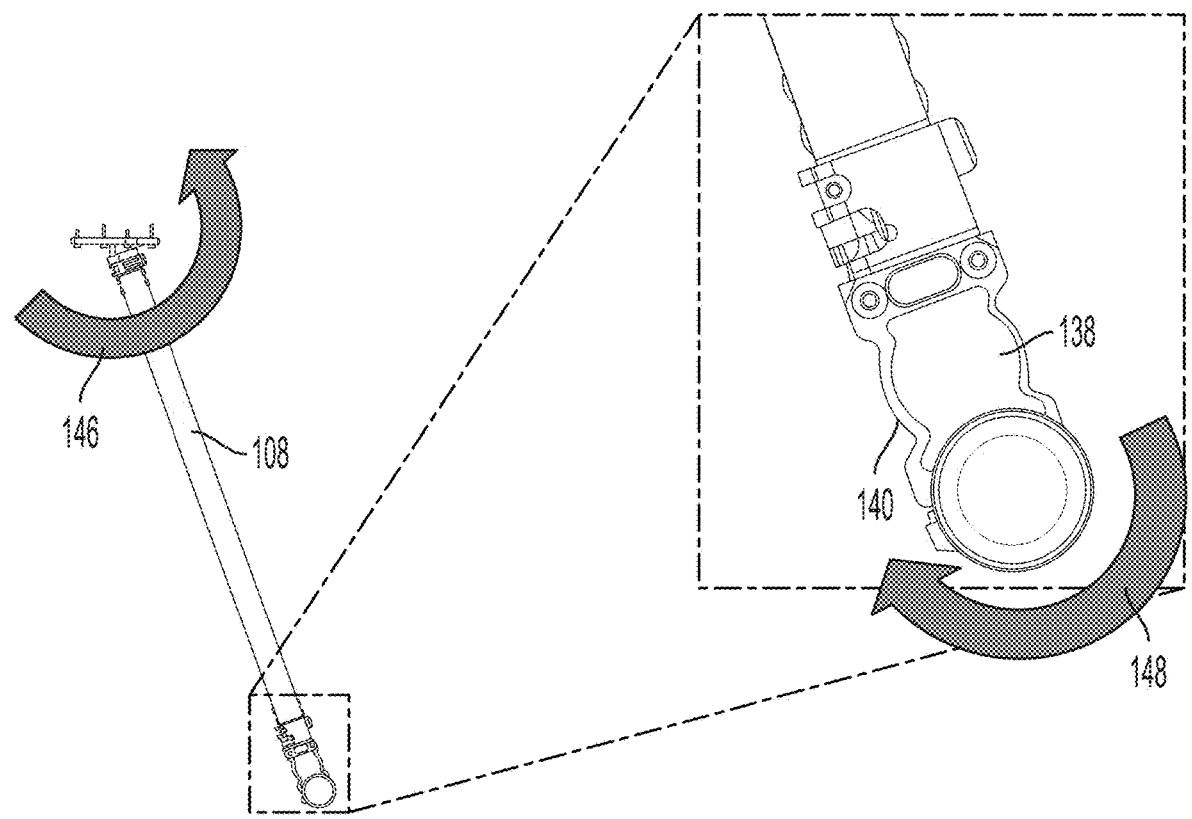
FIG. 11 depicts the forces incurred by the components of the landing gear, including a detailed magnification, in accordance with an embodiment of the present invention.
Figure 12:
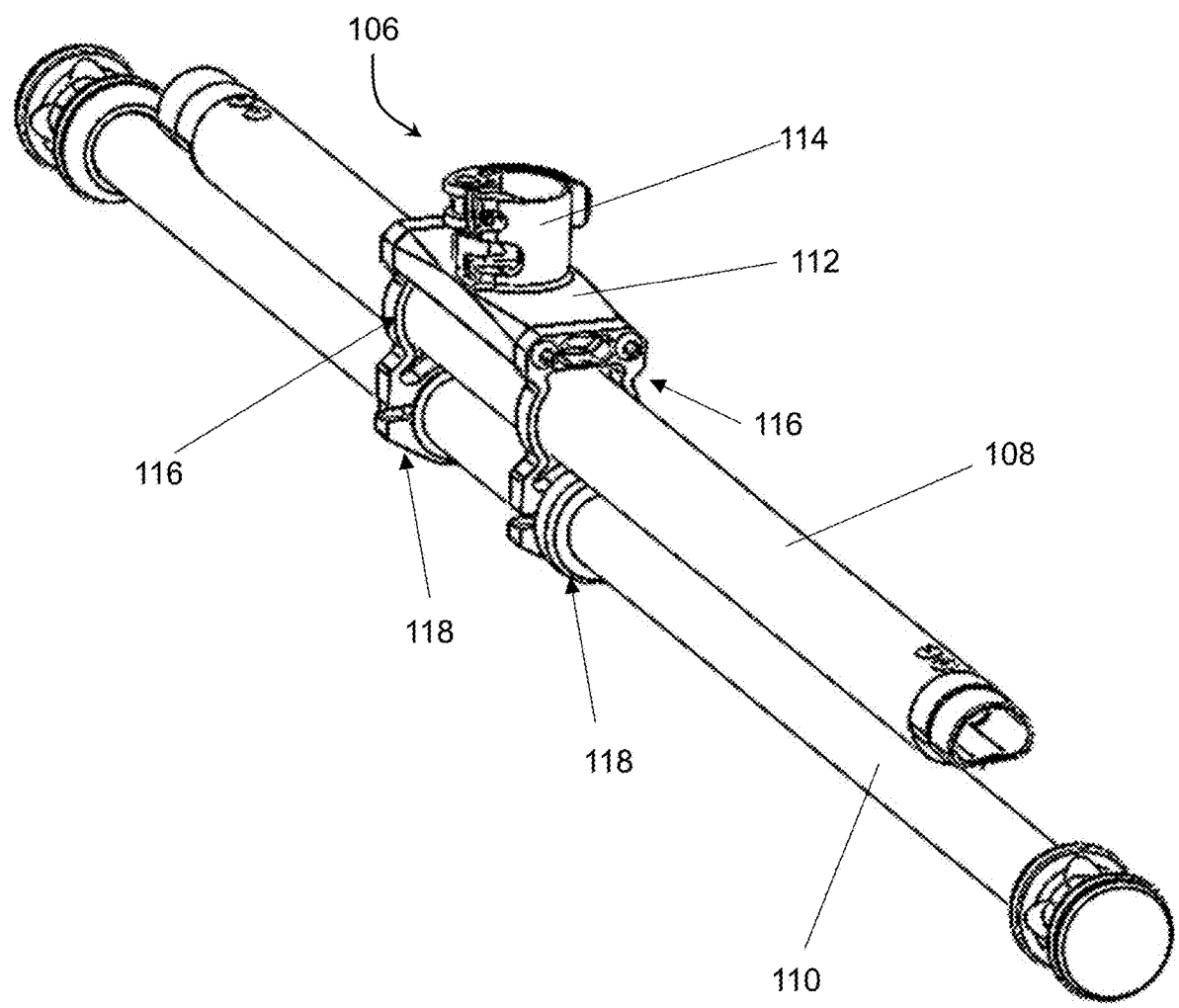
FIG. 12 is an isometric view of the landing gear showing the nesting feature of the energy absorbent nesting bracket in a disassembled and stowed state in accordance with an embodiment of the present invention.
Figure 13:
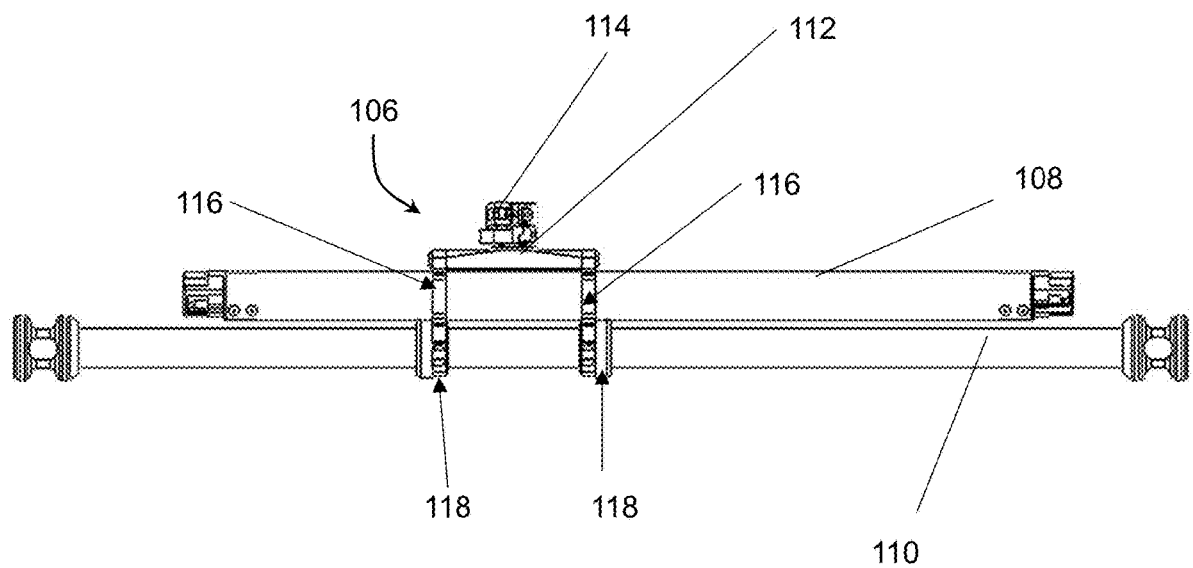
FIG. 13 is a side view of the landing gear showing the nesting feature of the energy absorbent nesting bracket in a disassembled and stowed state in accordance with an embodiment of the present invention.
Figure 14:
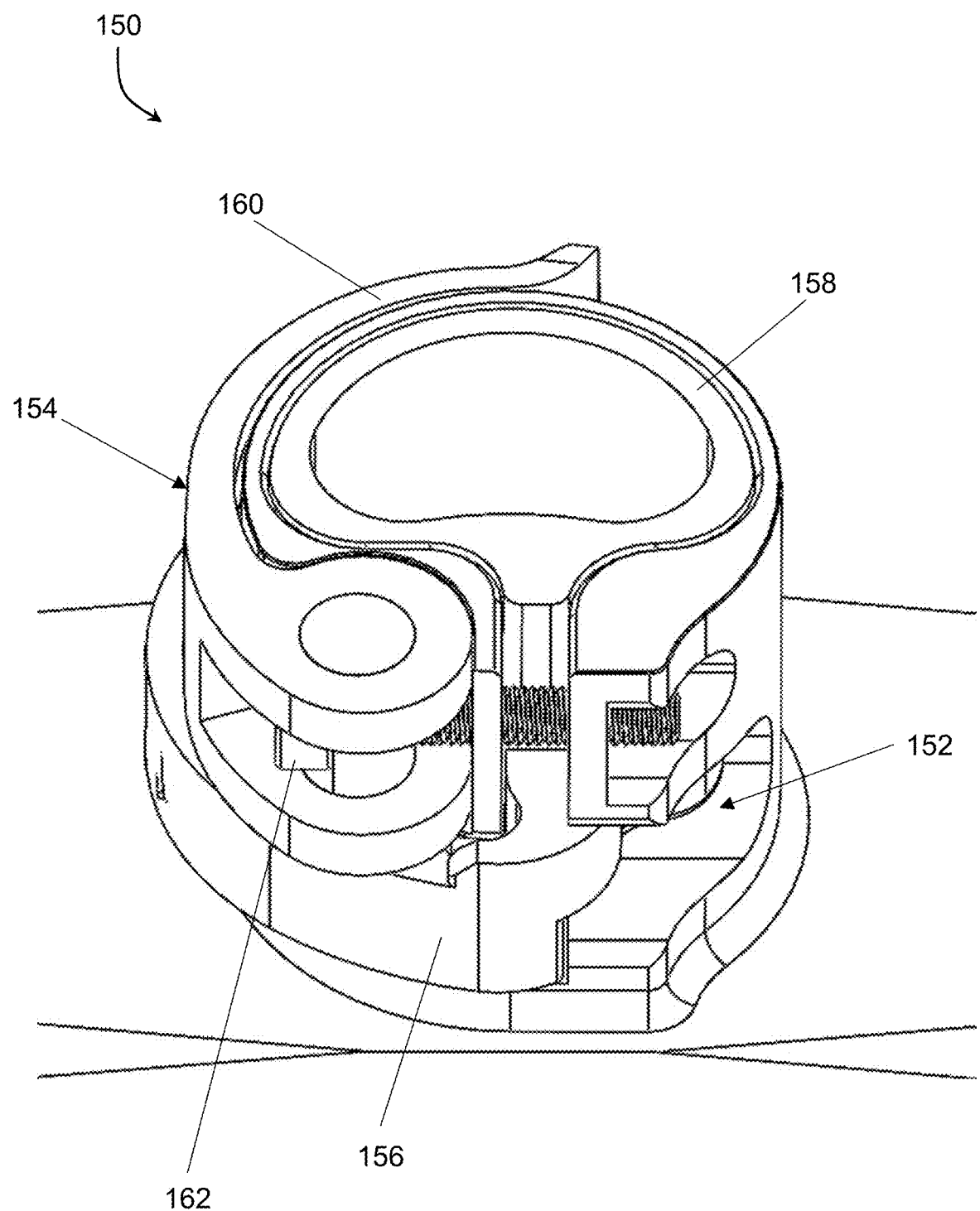
FIG. 14 is an isometric view of a coupling in accordance with an embodiment of the present invention.

FIGS. 8-10 present various views of crumple zone couplings 106. Here the plurality of energy-absorbent nesting brackets comprises two brackets 116 that are disposed at opposite ends of the cross-plate 112 from each other. In some embodiments, as seen here, the energy-absorbent nesting brackets 116 are bolted or screwed 134 to the cross-plate 112. The energy-absorbent nesting brackets 116 may also further comprise weight reduction cut-out features 136. In certain embodiments, the skid brackets 118 further comprise a ring 142 of soft interface material shaped and configured to be in contact with a horizontal skid 110 surrounded by a clamp 144 shaped and configured to engage the ring 142 of soft interface material which in turn fixedly engages the horizontal skid 110.

When an impact force is applied to the landing gear system 100 the two or more energy-absorbent nesting brackets 116 of each of the plurality of combination crumple zone couplings 106 deform at lesser impact force quantities than the first 108a and second 108b vertical strut and first 110a and second 110b horizontal skid components of the landing gear system 100 resulting in the plurality of energy-absorbent nesting brackets 116 absorbing the impact force and accordingly reducing force experienced by each of the first 108a and second 108b vertical struts and first 110a and second 110b horizontal skids. In certain embodiments, each of the two or more energy-absorbent nesting brackets 116 further comprises a pair of asymmetrical energy-absorbent crush struts comprised of a first crush strut 138 and a second crush strut 140 both extending between the lightweight cross-plate 112 and the skid bracket 118. In still other embodiments, the first crush strut 138 is structured to plastically deform under a relatively lesser applied force than the second crush strut 140. Thus, when an impact force is applied to the landing gear the first crush strut 138 plastically deforms before the second crush strut 140, creating a rotational force 146 that plastically deforms the nesting bracket 116 and therefore absorbs impact force energy deflecting it away from a remainder of the landing gear system 100. An example of this can be seen in FIG. 11, which shows how impact force causes an outward rotational force indicated by arrow 146 on the vertical strut 108, while the deforming of the first crush strut 138 before the second crush strut 140 causes an inward rotational force indicated by arrow 148 (in the detailed magnification) counteracting the outward rotational force 146.

Referring back to FIGS. 8-10, the two or more energy-absorbent nesting brackets 116 are axially aligned such that when the landing gear is disassembled and stowed, each energy-absorbent nesting bracket 116 slidingly receives a vertical strut 108 therethrough in a nesting orientation generally parallel to a horizontal skid 110 mounted in the skid brackets 118. When stowing the landing gear, each of the first vertical strut 108a and second vertical strut 108b is unlatched from the coupling for each of the plurality of combination crumple zone couplings 106 and then the first vertical strut 108a is slid through each of the energy-absorbent nesting brackets 116a of the first combination crumple zone coupling 106a in the nesting orientation generally parallel to the first horizontal skid 110a, and the second vertical strut 108b is slid through each energy-absorbent nesting brackets 116b of the second combination crumple zone coupling 106b in the nesting orientation generally parallel to the second horizontal skid 110b. An example of this can be seen in FIGS. 12-13.

In certain embodiments, each coupling 114 at the upper side of the lightweight cross-plate 112 of each of the combination crumple zone couplings 106 is coupled to the first 108a or second 108b vertical strut via a combination locking latch and vibration reduction latch 150 disposed on the upper side of the lightweight cross-plate 112. An example of this can be seen in FIG. 14.

The combination locking latch and vibration reduction latch 150 comprises a locking latch 152 and a vibration reduction latch 154 proximal to the locking latch 152. The locking latch 152 comprises a spring-loaded engagement mechanism 156 configured to releasably engage a catch at an end of a vertical strut 108. The vibration reduction latch 154 comprises a receiver 158 shaped and configured to mate with a keyed configuration and spine at an end of a vertical shaft 108 and a clamp 160 around the receiver with an adjustment mechanism 162 configured to releasably secure a mated keyed configuration disposed at the end of the vertical shaft in the vibration reduction latch 154 and adjust a resonant frequency of the landing gear system 100 via the adjustment mechanism 162.

Figure 15:
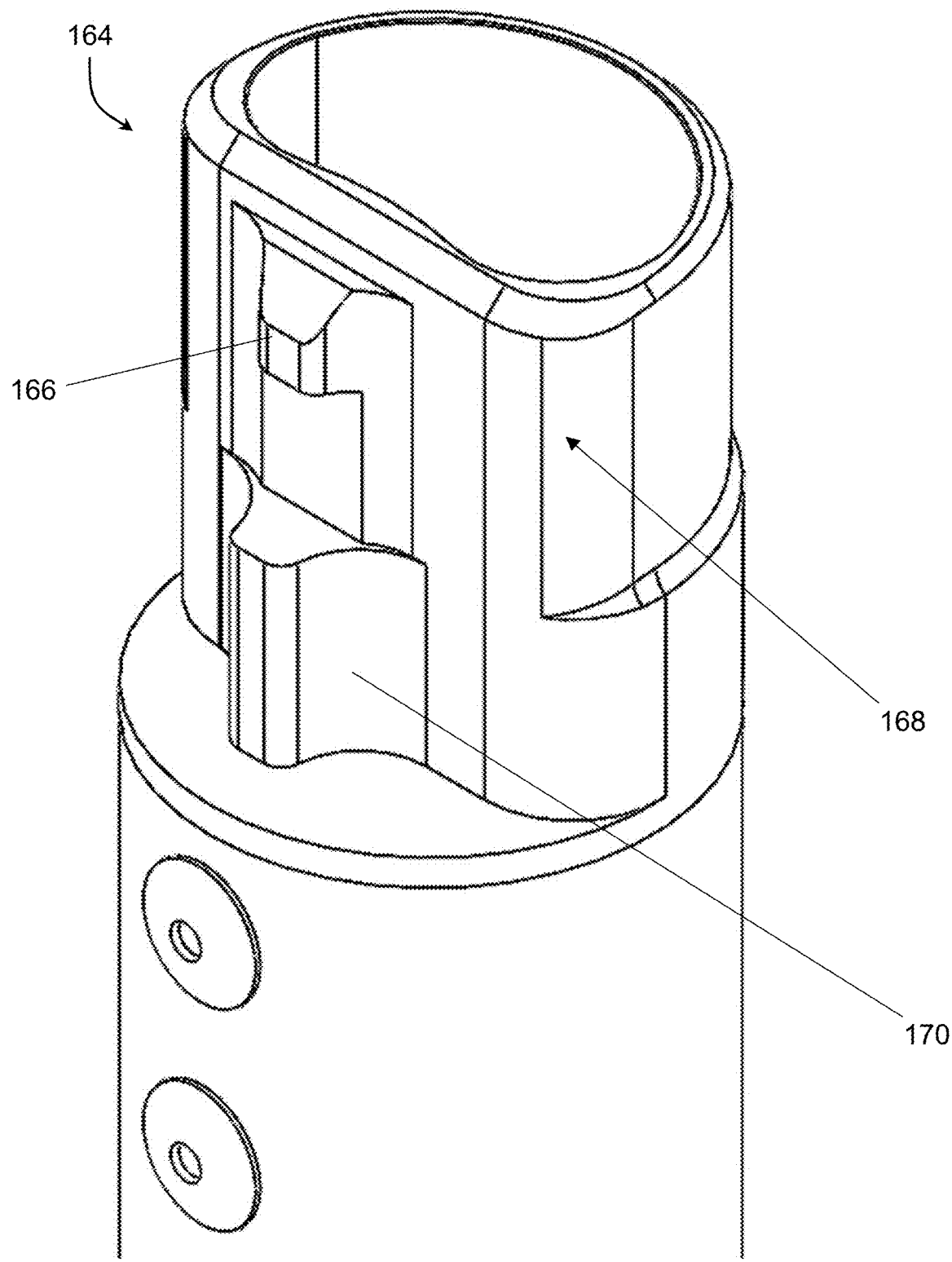
FIG. 15 is an isometric view of an end of a vertical strut showing a keyed configuration and a catch in accordance with embodiments of the present invention.
Figure 16:
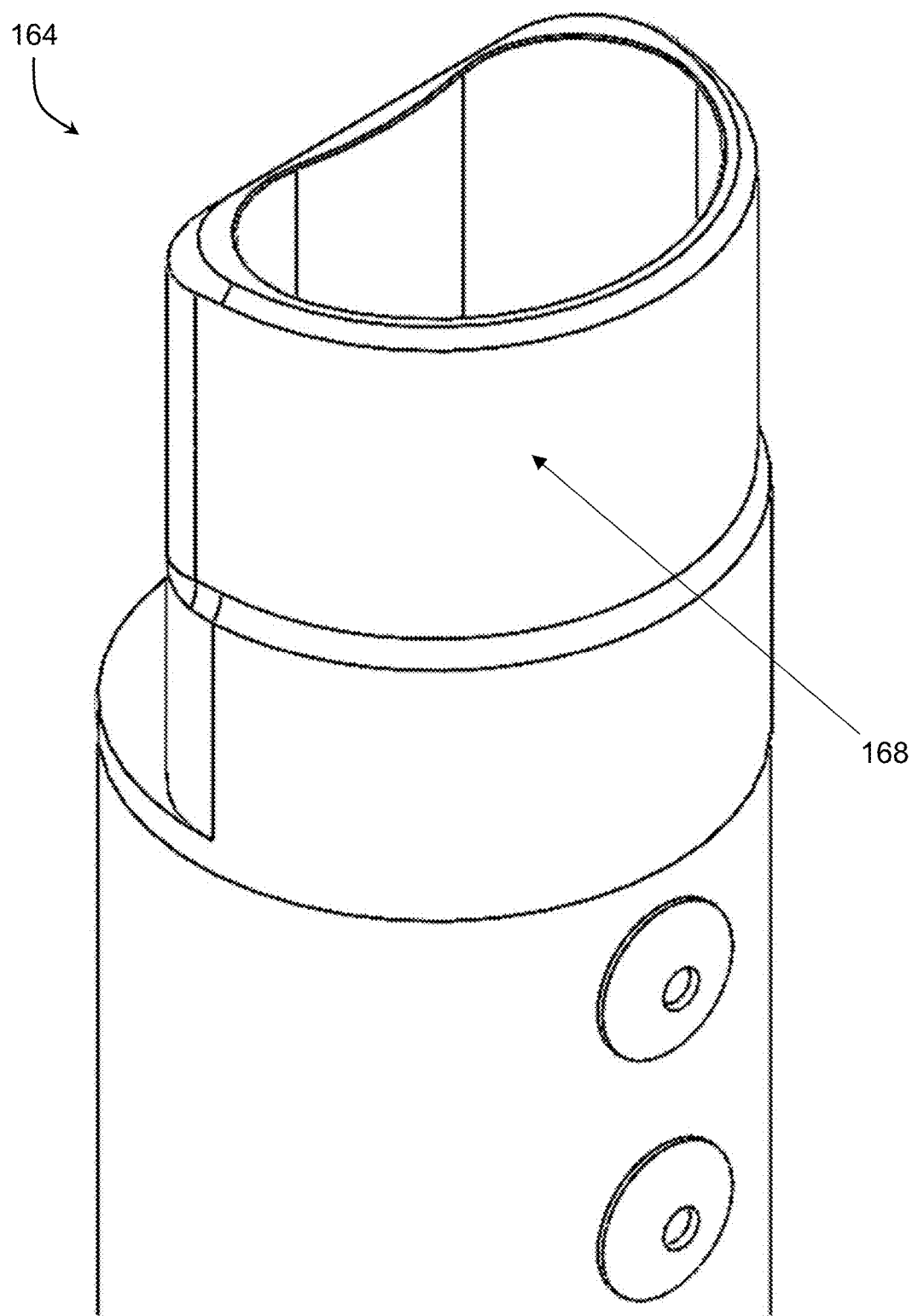
FIG. 16 is an isometric view showing the side opposite the keyed configurations and catch at the end of a vertical strut in accordance with an embodiment of the present invention.
Figure 17:
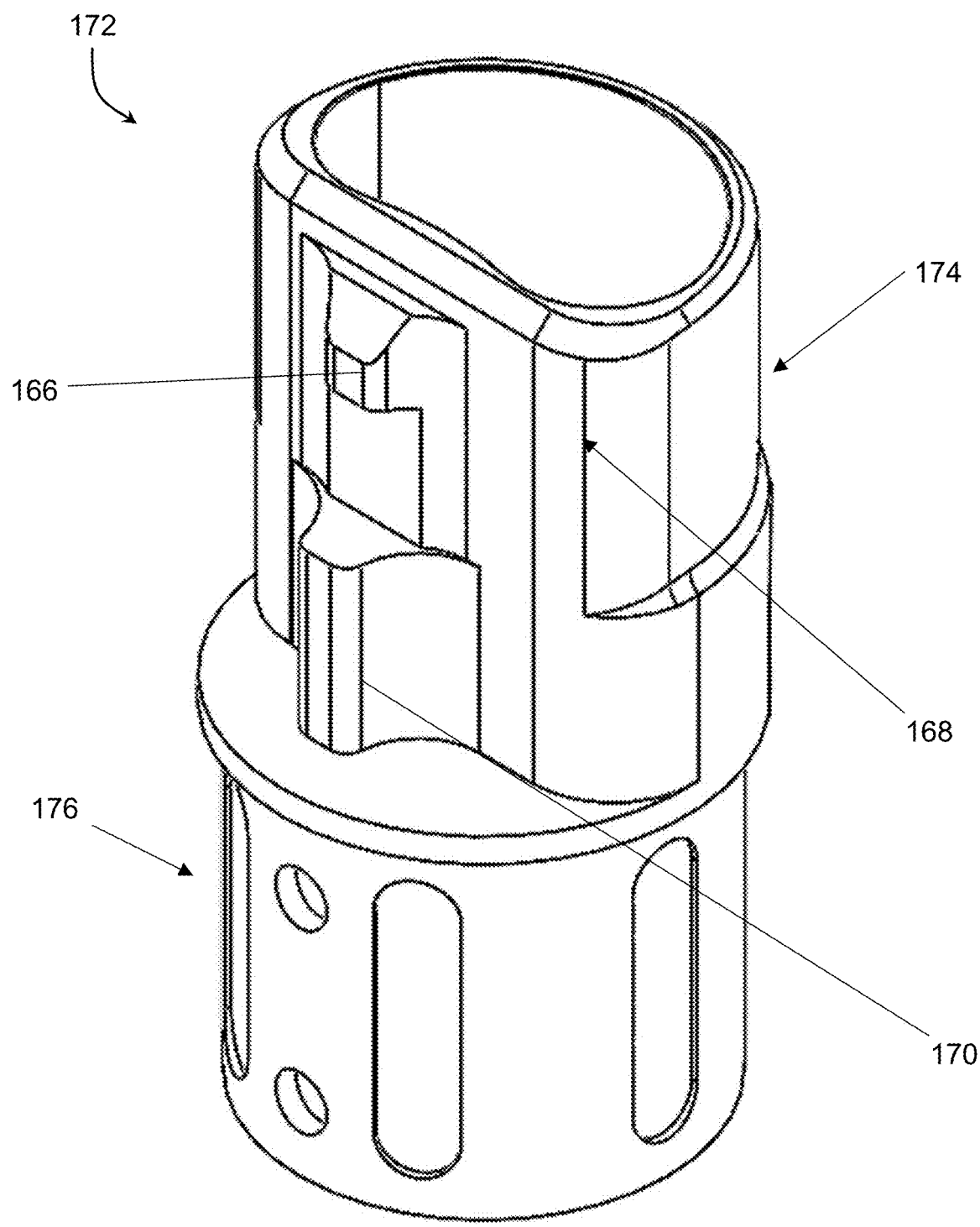
FIG. 17 is an isometric view of a connector cap in accordance with an embodiment of the present invention.
Figure 18:
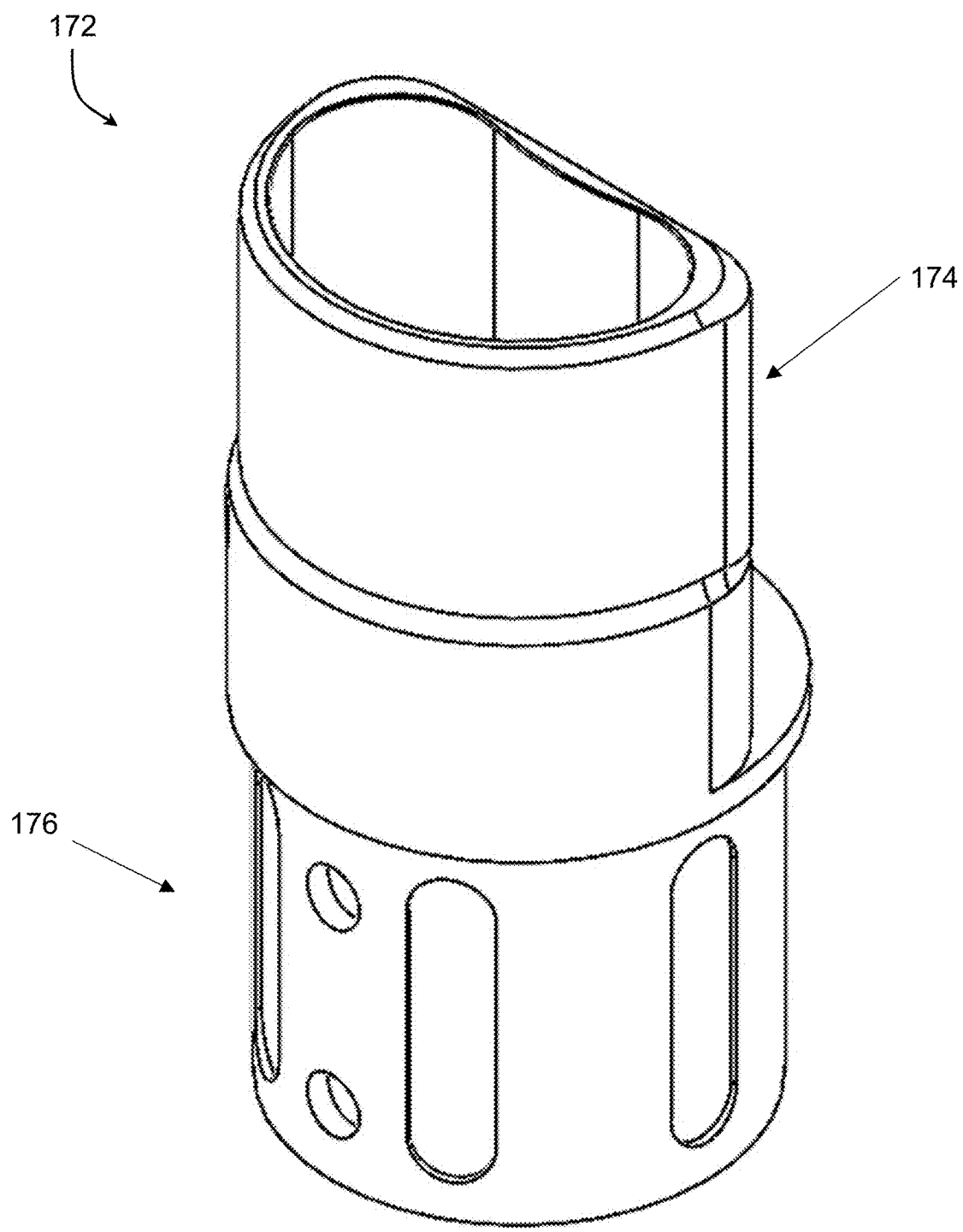
FIG. 18 is an isometric view of a connector cap showing the side opposite the connector cap in accordance with an embodiment of the present invention.

FIGS. 15-16 depict an example of an end 164 of a vertical strut 108 having a catch 166, keyed configuration 168, and spine feature 170. The keyed configurations 168 ensure that the vertical struts 108 and the combination crumple zone couplings 106 can only be assembled one way. Here, the keyed configuration 168 comprises a generally half-circle shape wherein the catch 166 and spine feature 170 are disposed on a flat side of the half-circle. In certain embodiments, the end 164 of the vertical strut further comprises a connector cap 172, an example of which can be seen in FIG. 17-18. The connector cap 172 comprises a first end 174 having a catch 166, keyed configuration 168, and spine feature 170 and a second end 176 configured to couple with a vertical strut 108. In some such embodiments, the second end 176 of the connector cap 172 is configured to be bolted, riveted, screwed, or adhered onto a vertical strut 108.

Figure 19:
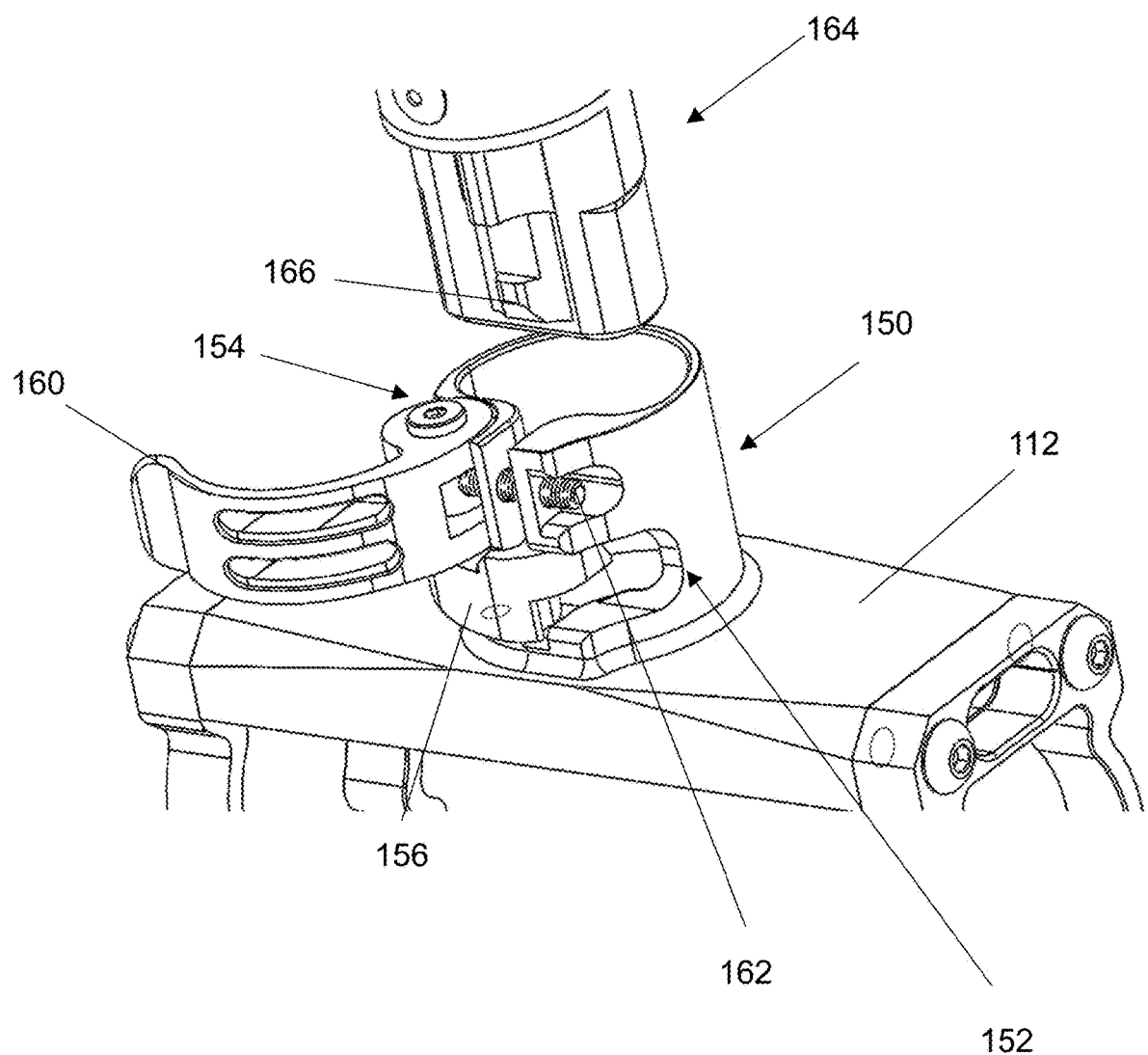
FIG. 19 is an isometric view of an end of a vertical strut being inserted into a coupling in accordance with an embodiment of the present invention.
Figure 20:
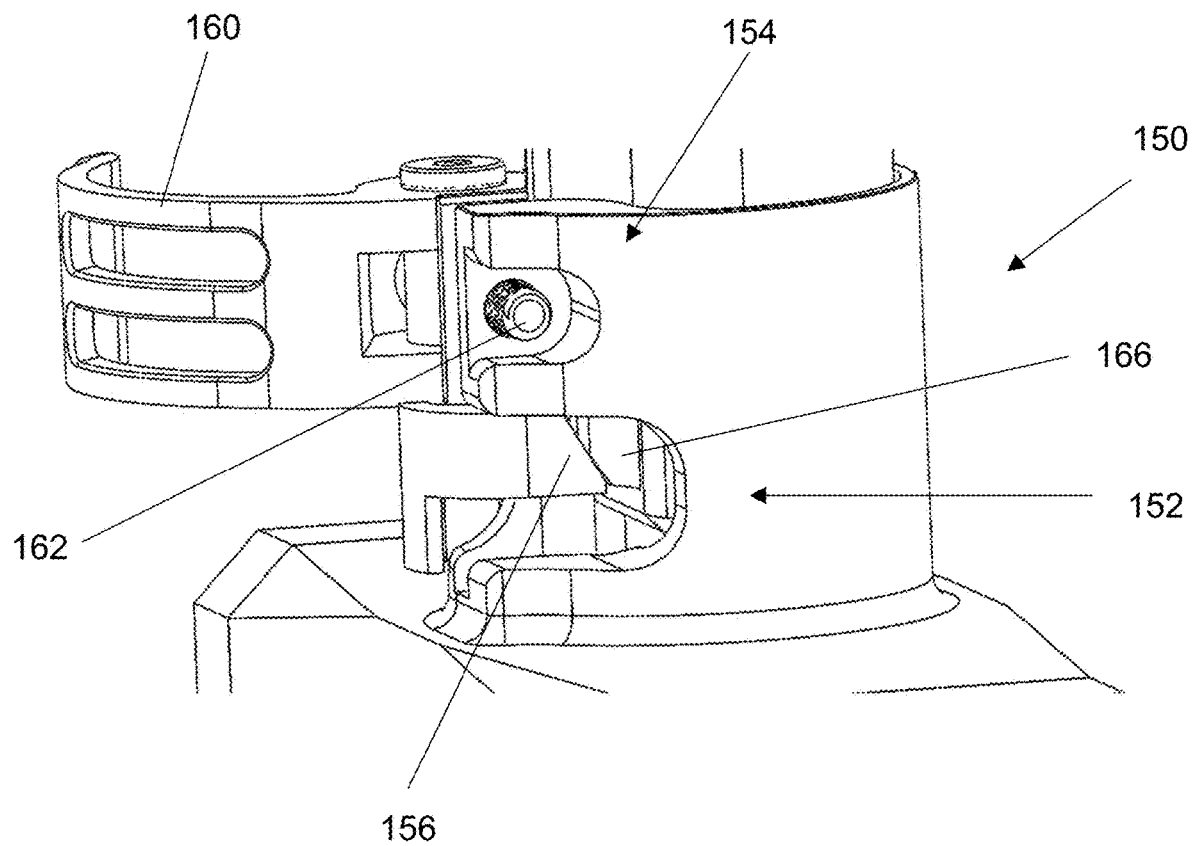
FIG. 20 an elevated view depicting the catch of an end of a vertical strut being inserted into a coupling beginning to mate with the engagement mechanism of a locking latch in accordance with an embodiment of the present invention.
Figure 21:
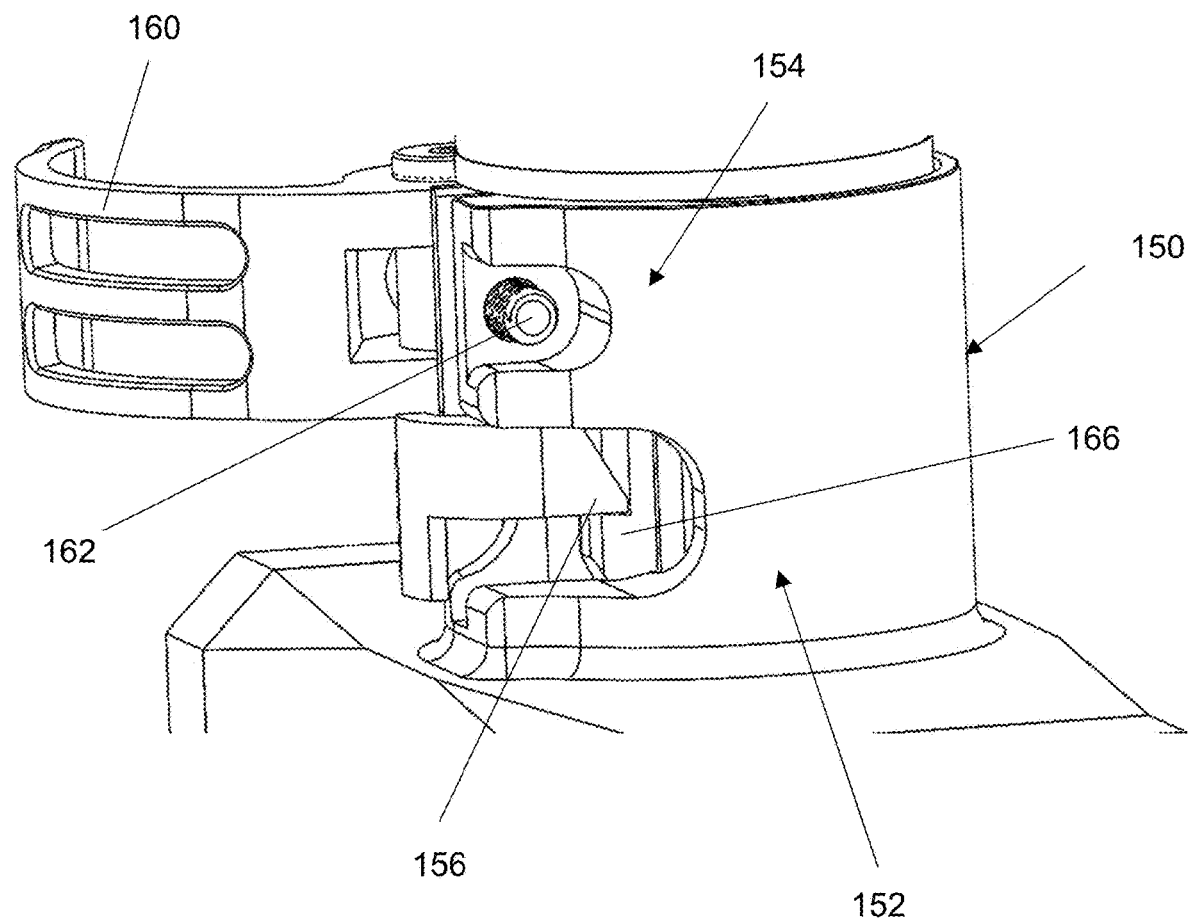
FIG. 21 is an elevated view depicting the catch of an end of a vertical strut being engaged by the engagement mechanism of a locking latch in accordance with an embodiment of the present invention.
Figure 22:
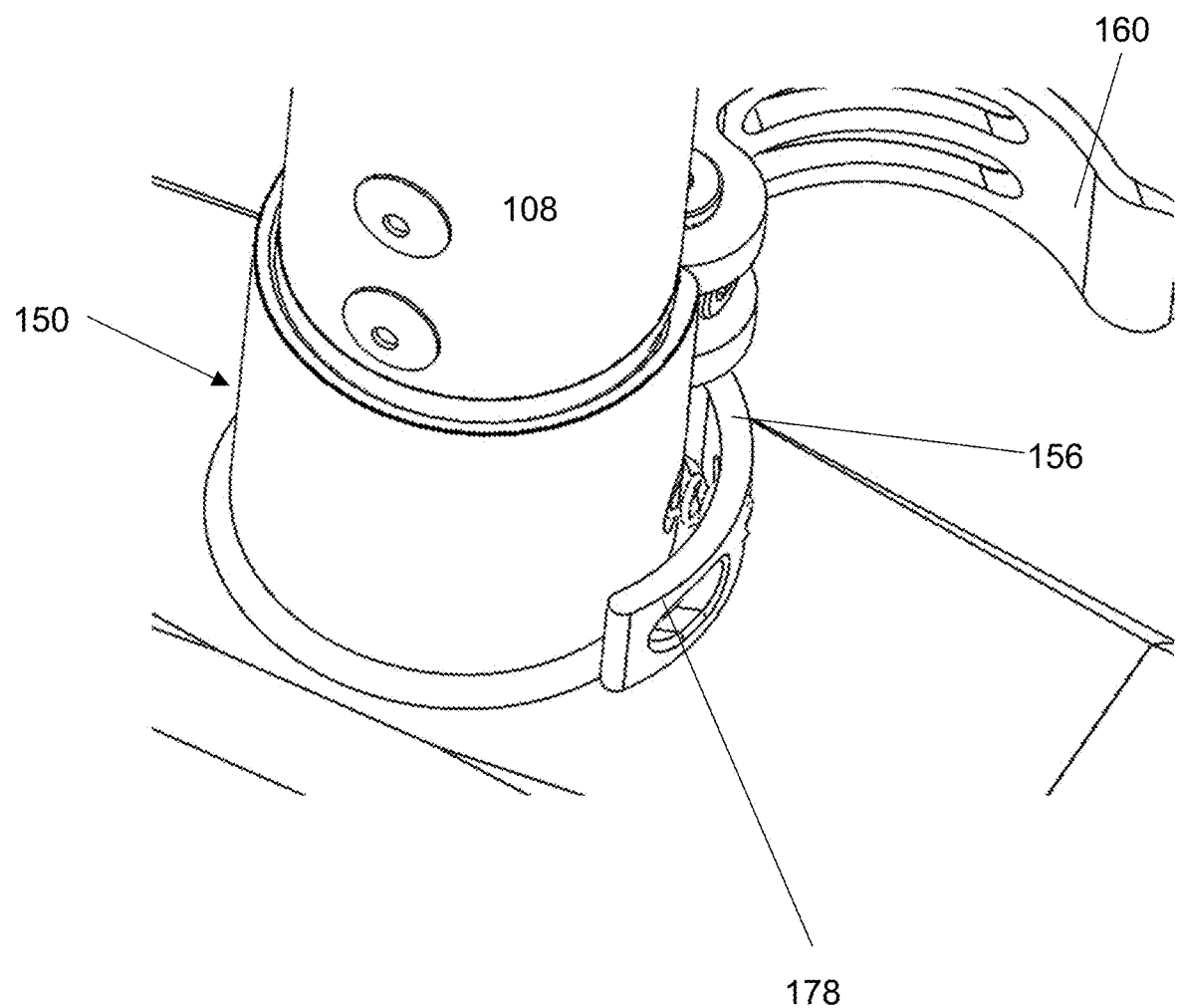
FIG. 22 is an isometric view depicting a spring loaded engagement mechanism that allows a locking latch that allows the locking latch to releasably engage the an end of a vertical strut in accordance with an embodiment of the present invention.
Figure 23:
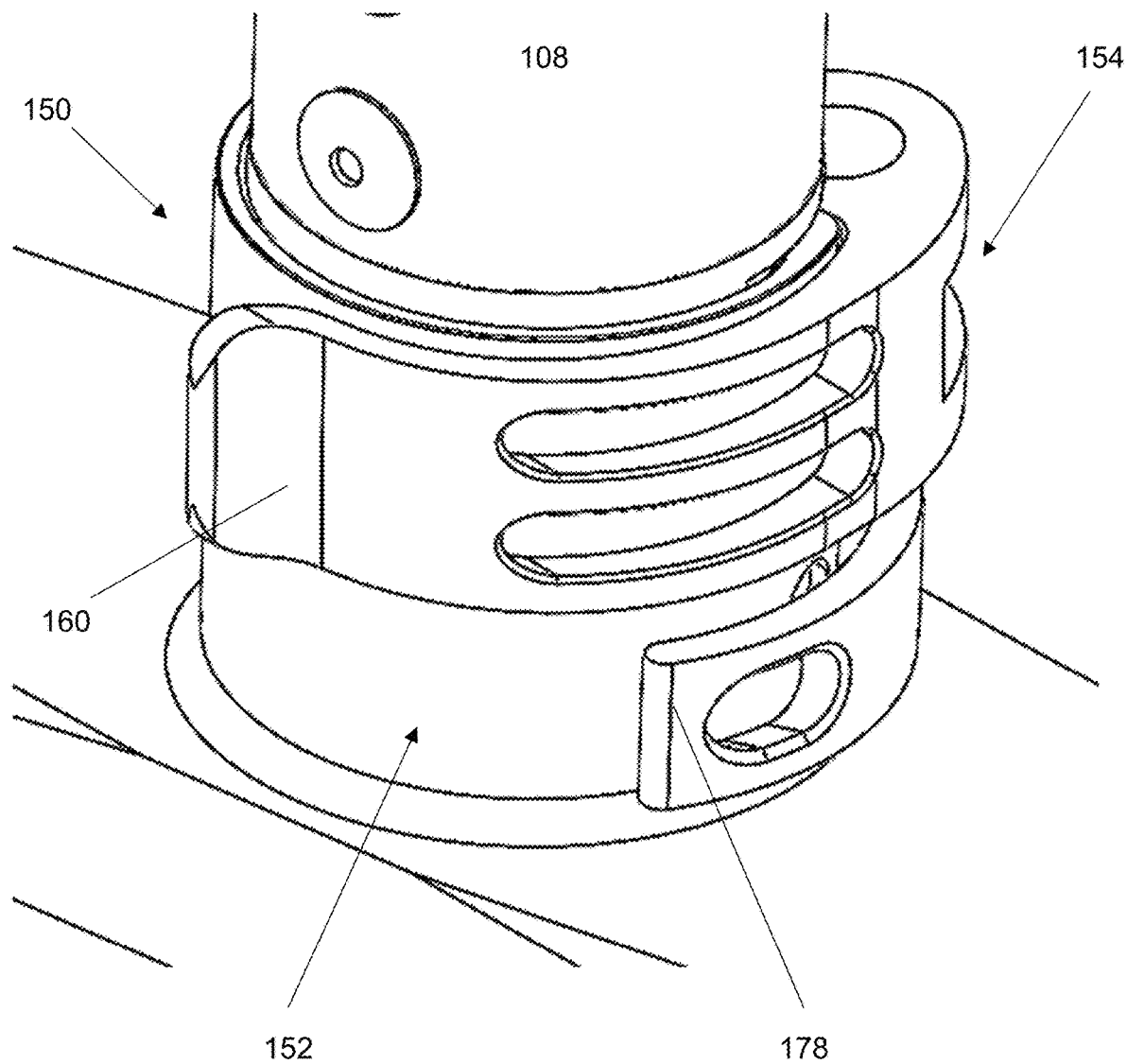
FIG. 23 is an isometric view depicting the engagement of a clamp of a vibration reduction latch in accordance with an embodiment of the present invention.
Figure 24:
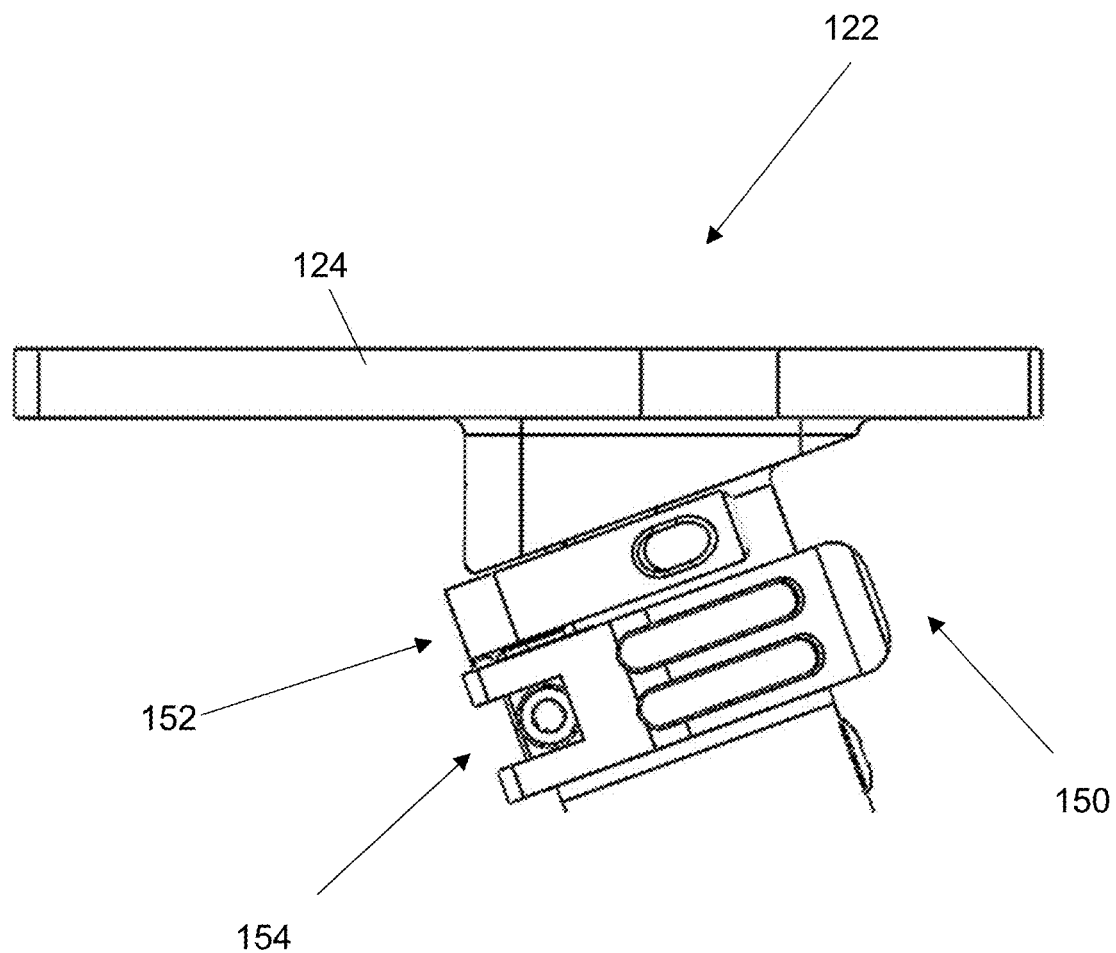
FIG. 24 is a side view depicting a mounting mechanism in accordance with an embodiment of the present invention.

FIGS. 19-23 depict the interaction of the combination locking latch and vibration reduction latch 150 with an end 164 of a vertical strut 108 having a catch 166, keyed configuration 168, and spine feature 170. FIG. 19 shows an end 164 of a vertical strut 108 being inserted into a coupling 114 comprising a combination locking latch and vibration reduction latch 150. FIG. 20 shows the catch 166 of an end 164 of a vertical strut 108 being inserted into a coupling 114 beginning to mate with the engagement mechanism 156 of a locking latch 152. FIG. 21 shows the catch 166 of being engaged by the engagement mechanism 156 of a locking latch 152. FIG. 22 shows a spring-loaded lever mechanism 178 that is pressed to release the engagement mechanism 156. FIG. 23 shows the engagement of the clamp 160 of a vibration reduction latch 154 securing the end 164 of the vertical strut 108 into the combination locking latch and vibration reduction latch 150 and applying resonant frequency adjustment.

In certain embodiments, the coupling 126 of the mounting mechanisms 122 may also comprise a locking latch and vibration reduction latch 150 having a locking latch 152 and a vibration reduction latch 154 proximal to the locking latch as described above.

The disclosed landing gear system is designed such that there is no left/right or top/bottom of the components so that if a piece physically mates, then it is in the correct orientation and position to function. This also enables a significant reduction in the number of parts used to fabricate the landing gear as many of the parts are identical. Lightweight materials (some instances may use carbon fiber and aluminum, while others may use fiberglass for reduced radio wave interference or titanium or other materials for different strengths and weights) are used to ensure that it does not add significantly to the overall weight of the drone. The design also enables the nesting of the landing gear components to minimize the overall size when disassembled. The landing gear can also be assembled/disassembled without the use of any tools, nor do they require any orientation markings since as long as the parts mate, they can be assembled, and they will be oriented correctly.

The disclosed landing gear system also can include a novel latching system that both ensures that components automatically lock to prevent detachment in flight and also allows for adjustment to the natural frequency of landing gear to minimize any vibrational impact on sensitive drone payloads or the drone flight control. The automatic locking latch provides positive locking of the landing gear components on insertion. Because there are numerous operational incidents where landing gear components that require pins, attachment of springs, or closing of latches, historically these components have fallen off in flight due to operator error. The automatic locking latch prevents these types of user errors. The frequency reduction latch then changes the natural frequency of the overall landing gear so that it does not interfere with drone payloads or drone flight control. This is important since many landing gear vibrate in flight and can impact payloads or the drone.

The landing gear was also designed to ensure that it protects both drone payloads and the drone itself during a hard landing or ground impact. Many landing gear systems will experience fractures in the vertical or horizontal landing gear component during a hard landing, which can result in damage to the payload or drone. The landing gear system described herein is designed such that it has a specific crumple zone that will absorb hard impacts before the overall vertical or horizontal structures fracture or break. This is coupled with specifically designed angles of the vertical components of the landing gear relative to the drone body to account for the flexing of the vertical leg component.

The frequency reduction latch clamps make use of a deformable receiver and a connector cap with a spine feature on the vertical strut. The use of the spine feature allows tight coupling to change the natural frequency of the overall landing gear, however, this also allows for lower tolerances of the rest of the mating surfaces of the landing gear components. This reduces both the manufacturing requirements, but it also enables better operations in field conditions over time. This is important as parts can wear over time and by leveraging this design this has minimal impact. In addition, many drones are operated in dusty and dirty conditions. The design to clamp on the spine feature of the connector cap and/or end of a strut ensures that dirt and other contaminants that collect on the mating surfaces will be less likely to impact the mating since these tolerances can be high.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Unless otherwise noted or defined herein, to the extent directional vocabulary is utilized, the disclosure and figures are described with reference to a conventional three-dimensional Cartesian coordinate axis system of X, Y and Z, where the Y direction is generally left-right or east-west, the Z direction is generally up-down or north-south on the page, and the X direction is generally in-out, relative to the plane of the page of the document. Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Y-axis lies in the horizontal direction (left-right on the page), the Z-axis lies in the vertical direction (up-down on the page), and the X-axis is orthogonal to the page (in-out relative to the page). To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A modular and stowable drone landing gear system configured for repeated assembly and disassembly, the landing gear comprising:
   a plurality of combination crumple zone couplings, each comprising:
      a cross-plate having an upper side and an underside on an opposite side of the cross-plate;
      a coupling disposed on the upper side of the cross-plate configured to receive an end of a vertical strut; and
      two or more energy-absorbent nesting brackets extending outward from the underside of the cross-plate distally spaced from each other, each nesting bracket further connected with a skid bracket for each nesting bracket, respectively, on an opposite end of the nesting bracket from the cross-plate and configured to removably and replaceably couple with a horizontal skid, wherein the skid brackets are axially aligned with each other to receive and couple to a same horizontal skid;
      wherein the two or more energy-absorbent nesting brackets are axially aligned such that when the landing gear is disassembled and stowed, each energy-absorbent nesting bracket slidingly receives a vertical strut through the energy-absorbent nesting bracket in a nesting orientation substantially parallel to a horizontal skid mounted in the skid brackets;
   a first vertical strut removably and replaceably coupled with a first horizontal skid by a first combination crumple zone coupling of the plurality of combination crumple zone couplings, the first vertical strut coupled at the coupling at the upper side of the cross-plate and the first horizontal skid mounted in the skid brackets of the first combination crumple zone coupling; and
   a second vertical strut removably and replaceably coupled with a second horizontal skid by a second combination crumple zone coupling of the plurality of combination crumple zone couplings, the second vertical strut coupled at the coupling at the upper side of the cross-plate and the second horizontal skid mounted in the skid brackets of the second combination crumple zone coupling;
   wherein when stowing the landing gear, each of the first vertical strut and second vertical strut is unlatched from coupling for each of the plurality of combination crumple zone couplings and then the first vertical strut is slid through each of the energy-absorbent nesting brackets of the first combination crumple zone coupling in the nesting orientation substantially parallel to the first horizontal skid, and the second vertical strut is slid through each energy-absorbent nesting brackets of the second combination crumple zone coupling in the nesting orientation substantially parallel to the second horizontal skid; and
   wherein when an impact force is applied to the landing gear the two or more energy-absorbent nesting brackets of each of the plurality of combination crumple zone couplings deform at lesser impact force quantities than the first and second vertical strut and first and second horizontal skid components of the landing gear, resulting in the plurality of energy-absorbent nesting brackets absorbing the impact force and accordingly reducing force experienced by each of the first and second vertical struts and first and second horizontal skids.

2. The landing gear system of claim 1, wherein the plurality of energy-absorbent nesting brackets comprises two brackets that are disposed at opposite ends of the cross-plate from each other.

3. The landing gear system of claim 1, wherein each of the two or more energy-absorbent nesting brackets further comprises a pair of asymmetrical energy-absorbent crush struts comprised of a first crush strut and a second crush strut both extending between the cross-plate and the skid bracket.

4. The landing gear system of claim 3, wherein the first crush strut is structured to plastically deform under a relatively lesser applied force than the second crush strut.

5. The landing gear system of claim 4, wherein when an impact force is applied to the landing gear the first crush strut plastically deforms before the second crush strut, creating a rotational force that plastically deforms the nesting bracket and absorbs impact force energy deflecting the nesting bracket away from a remainder of the landing gear system.

6. The landing gear system of claim 1, wherein the cross-plate is formed of a carbon fiber, aluminum, fiberglass, or metal alloy.

7. The landing gear system of claim 1, wherein the cross-plate comprises a plurality of weight reduction cut-out features.

8. The landing gear system of claim 1, wherein each coupling at the upper side of the cross-plate of each of the combination crumple zone couplings is coupled to the first or second vertical strut via a combination locking latch and vibration reduction latch disposed on the upper side of the cross-plate.

9. The landing gear system of claim 8, wherein the combination locking latch and vibration reduction latch comprises:
   a locking latch comprising a spring-loaded engagement mechanism configured to releasably engage a catch at an end of a vertical strut; and
   a vibration reduction latch proximal to the locking latch, the vibration reduction latch comprising:
      a receiver shaped and configured to mate with a keyed configuration and spine feature at an end of a vertical shaft; and
      a clamp around the receiver with an adjustment mechanism configured to releasably secure a mated keyed configuration in the vibration reduction latch and adjust a resonant frequency of the landing gear via the adjustment mechanism;
   wherein the keyed configuration is disposed at the end of the vertical shaft.

10. The landing gear system of claim 9, wherein the keyed configuration comprises a substantially half-circle shape wherein the catch and spine feature are disposed on a flat side of the half-circle.

11. The landing gear system of claim 9, wherein the engagement mechanism of the locking latch comprises a spring-loaded lever mechanism that is pressed to release the engagement mechanism.

12. The landing gear system of claim 9, wherein the receiver is formed of a deformable material.

13. The landing gear system of claim 9, wherein the adjustment mechanism comprises a screw.

14. The landing gear system of claim 9, wherein the end of the vertical strut further comprises a connector cap comprising:
   a first end having a keyed configuration, catch, and spine feature; and
   a second end configured to couple with an end of the vertical strut.

15. The landing gear system of claim 14, wherein the second end of the connector caps is bolted, riveted, screwed, or adhered onto ends of vertical struts.

16. The landing gear system of claim 1, wherein each vertical strut comprises a tube formed from one or more of: carbon fiber, fiberglass, aluminum, and metal alloys.

17. The landing gear system of claim 1, wherein the skid brackets further comprise a ring of interface material shaped and configured to be in contact with a horizontal skid surrounded by a clamp shaped and configured to engage the interface material which in turn fixedly engages the horizontal skid.

18. The landing gear system of claim 1, wherein the plurality of combination crumple zone couplings are mounted offset from a midpoint of the first and second horizontal skids resulting in the first and second horizontal skids being mounted off-center from the first and second vertical struts when the landing gear is in an assembled state.

19. The landing gear system of claim 1, wherein the energy-absorbent nesting brackets are bolted or screwed to the cross-plate.

20. The landing gear system of claim 1, wherein the energy-absorbent nesting brackets further comprise a plurality of weight reduction cut-out features.

21. The landing gear system of claim 1, wherein the first and second horizontal skids comprise a tube formed from one or more of: carbon fiber, fiberglass, aluminum, and metal alloys.

22. The landing gear system of claim 1, wherein each of the first and second horizontal skids further comprises end caps disposed on ends of the first and second horizontal skids.

23. The landing gear system of claim 22, wherein the end caps are formed of a soft elastically deformable material.

24. The landing gear system of claim 1, further comprising two or more drone mounting mechanisms, each mechanism comprising:
   a base shaped and configured to attach to a drone; and
   a coupling extending from the base at a desired angle for engaging another end of one of the first and second vertical struts.

25. The landing gear system of claim 24, wherein the desired angle at which each coupling is attached to each base is determined such that the first and second vertical struts extend outward and away from the drone when attached to the couplings and a distance between each of the first and second vertical struts increases in conjunction with an increased distance from the bases and the drone.

26. The landing gear of claim 24, wherein the coupling comprises:
   a locking latch comprising a spring-loaded engagement mechanism configured to releasably engage a catch at an end of a vertical strut; and
   a vibration reduction latch proximal to the locking latch, the vibration reduction latch comprising:
      a receiver shaped and configured to mate with a keyed configuration and spine feature at an end of a vertical shaft; and
      a clamp around the receiver with an adjustment mechanism configured to releasably secure a mated keyed configuration in the vibration reduction latch and adjust a resonant frequency of the landing gear via the adjustment mechanism;
   wherein the keyed configuration is disposed at the end of the vertical shaft.

27. The landing gear of claim 1, wherein the first and second vertical struts are reversible and interchangeable, the first and second horizontal skids are reversible and interchangeable, and the combination crumple zone couplings are interchangeable.

28. The landing gear of claim 1, wherein the ends of the first and second vertical struts and the couplings disposed on the upper side of the cross-plates are keyed so the cross-plates are configured to be only coupled one way.

\* \* \* \* \*